(12) United States Patent
Nakatani et al.

(10) Patent No.: US 9,140,598 B2
(45) Date of Patent: Sep. 22, 2015

(54) MASS MEASUREMENT DEVICE

(71) Applicant: ISHIDA CO., LTD., Kyoto-shi, Kyoto (JP)

(72) Inventors: Makoto Nakatani, Ritto (JP); Akihito Suzuki, Ritto (JP); Satoshi Konishi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 14/345,723

(22) PCT Filed: Sep. 18, 2012

(86) PCT No.: PCT/JP2012/073856
§ 371 (c)(1),
(2) Date: Mar. 19, 2014

(87) PCT Pub. No.: WO2013/042667
PCT Pub. Date: Mar. 28, 2013

(65) Prior Publication Data
US 2014/0230581 A1  Aug. 21, 2014

(30) Foreign Application Priority Data

Sep. 20, 2011 (JP) ................................ 2011-204357
Feb. 24, 2012 (JP) ................................ 2012-039107
Mar. 6, 2012 (JP) ................................ 2012-048945
Mar. 19, 2012 (JP) ................................ 2012-061899
Apr. 3, 2012 (JP) ................................ 2012-084461

(51) Int. Cl.
*G01G 19/00* (2006.01)
*B25J 13/08* (2006.01)
(Continued)

(52) U.S. Cl.
CPC ............... *G01G 19/00* (2013.01); *B25J 13/085* (2013.01); *B25J 13/088* (2013.01); *B25J 19/02* (2013.01); *G01G 3/14* (2013.01); *G01G 9/00* (2013.01)

(58) Field of Classification Search
USPC ...................... 73/865, 495, 509–510, 504.01; 702/141, 417; 177/139, 145, 149
See application file for complete search history.

(56) References Cited

U.S. PATENT DOCUMENTS 4,165,975 A      8/1979  Kwiatkowski et al.
4,710,884 A  *  12/1987  Tokairin et al. ............... 700/261
(Continued)

FOREIGN PATENT DOCUMENTS

CN    102538934 A    7/2012
JP    03-130808 A    6/1991
(Continued)

OTHER PUBLICATIONS

Yusaku Fujiiand Kazuhito Shimada, Instrument for measuring the mass of an astronaut, Measurement Science and Technology, Oct. 1, 2006, pp. 2705-2710, vol. 17, No. 10, Institute of Physics Publishing, Bristol, Great Britain.
(Continued)

*Primary Examiner* — Hezron E Williams
*Assistant Examiner* — Xin Zhong
(74) *Attorney, Agent, or Firm* — Global IP Counselors, LLP

(57) ABSTRACT

A mass measurement device measures the mass of an article, even when the article is being moved. A mass measurement device includes a robot hand, a robot arm, a force sensor, an acceleration sensor, and a control unit. The robot hand holds an article (Q). The robot arm moves the robot hand. The force sensor is provided between the robot hand and the robot arm and measures force acting on the article (Q) during movement. The acceleration sensor measures acceleration acting on the article (Q) during the movement. The control unit runs and controls the robot hand and the robot arm, and calculates the mass of the article (Q) on the basis of the force and acceleration acting on the article (Q) during the movement.

6 Claims, 19 Drawing Sheets

(51) Int. Cl.
*B25J 19/02* (2006.01)
*G01G 3/14* (2006.01)
*G01G 9/00* (2006.01)

(56) References Cited

U.S. PATENT DOCUMENTS

| | | | |
|---|---|---|---|
| 4,906,907 A * | 3/1990 | Tsuchihashi et al. | 318/568.22 |
| 5,285,860 A * | 2/1994 | Wirth | 177/139 |
| 5,526,697 A * | 6/1996 | Tada et al. | 73/862.634 |
| 5,551,308 A * | 9/1996 | Arai et al. | 73/862.541 |
| 5,744,728 A * | 4/1998 | Suita et al. | 73/862.542 |
| 5,837,945 A * | 11/1998 | Cornwell et al. | 177/136 |
| 5,917,159 A * | 6/1999 | Kostiuk | 177/136 |
| 2010/0094312 A1* | 4/2010 | Ruiz Morales et al. | 606/130 |
| 2011/0066394 A1* | 3/2011 | Schneider et al. | 702/101 |

FOREIGN PATENT DOCUMENTS

| | | |
|---|---|---|
| JP | 06-246652 A | 9/1994 |
| JP | 08-110261 A | 4/1996 |
| JP | 2000-171286 A | 6/2000 |
| JP | 2006-084371 A | 3/2006 |
| JP | 2008-026263 A | 2/2008 |
| JP | 2011-047718 A | 3/2011 |

OTHER PUBLICATIONS

Extended European Search Report of the corresponding European Application No. 12834227.6, dated May 28, 2015.

* cited by examiner

CHANGE OF REFERENCE POINT
$mg \cdot \sin \theta$

MASS MEASUREMENT DEVICE

TECHNICAL FIELD

The present invention relates to a mass measurement device, and more particularly relates to a mass measurement device for measuring the mass of a moving article during movement thereof.

BACKGROUND ART

It is generally assumed that a spring balance and/or an electronic balance is used in a stationary state in order to exclude the effect of acceleration other than the gravitational acceleration. However, there has recently been an increase in the use of mass measurement devices that are mounted on a shaking object and measure mass in which measurement errors caused by shaking have been removed. For example, the mass measurement device disclosed in Patent Document 1 (Japanese Laid-open Publication No. 8-110261) is configured so as to detect the up-and-down movement component of a floor using a dummy load cell carrying a counterweight apart from an ordinary measurement load cell, and the up-and-down movement component thus detected is subtracted from the output signal of the measurement load cell to thereby output a measurement signal that does not include the up-and-down movement component of the floor.

SUMMARY OF THE INVENTION

Technical Problem

However, the mass measurement device described in the Patent Document 1 also uses the concept of a load cell being displaced in the perpendicular direction by gravity that acts on an article, and therefore, the mass of an article cannot be detected when the load cell is in a state in which displacement does not occur depending on gravity.

Consequently, it is difficult with conventional techniques to measure the mass of an article in a configuration in which a load cell has been attached to the distal end part of, e.g., a manipulator or a robot hand for lifting and moving the article, and the lifted article is currently moving.

An object of the present invention is to provide a mass measurement device capable of measuring the mass of an article, even when the article is being moved.

Solution to Problem

A mass measurement device according to a first aspect of the present invention is a mass measurement device for measuring a mass of an article while the article is being moved, the mass measurement device comprising a holding mechanism, a movement mechanism, a force measurement unit, an acceleration measurement unit, and a control unit. The holding mechanism holds the article. The movement mechanism moves the holding mechanism. The force measurement unit is provided between the holding mechanism and the movement mechanism and adapted for measuring force acting on the article during movement. The acceleration measurement unit measures acceleration acting on the article during movement. The control unit runs and controls the holding mechanism and the movement mechanism, and calculates the mass of the article on the basis of the force and acceleration acting on the article during movement.

With this mass measurement device, the mass of an article can be measured even when the article is being moved. Therefore, the mass measurement device can be attached to, e.g., the distal end part of a robot hand to make it possible to measure the mass of an article while the article is being moved in accompaniment with conveyance.

For example, in an existing line in which products that are sent in sequential fashion from a manufacturing line are gripped by a robot hand and boxed, a weight checker for checking the content quantity of a product, and a sorting device for excluding products with insufficient content quantity from the line must be provided to the preceding stage.

However, the use of a robot hand in which this mass measurement device has been incorporated allows the mass of the product to be measured to check the correctness of the content quantity while the product is gripped and being moved. Therefore, a weight checker, a sorting device, and the like used until now can be removed from an existing line.

Additionally, in a classification line for assorting products by rank in accordance with the mass of the product, first, there is a device for adding products to the line, then there is a weight checker or the like for measuring the mass of the added product, and lastly there is a device for classifying in accordance with the measured mass. Using a robot hand in which the mass measurement device according to the present invention has been incorporated allows all of the processes carried out by the product adding device, the weight checker, and the classification device to be carried out using a single device.

Also, since the effect of gravitational acceleration can be excluded and the mass of an article can be measured, it is no longer necessary to make regional gravity corrections to scales, which are performed in locations such as Japan due to gravitational differences in each region.

A mass measurement device according to a second aspect of the present invention is the mass measurement device according to the first aspect of the present invention, wherein the control unit divides the force acting on the article during movement by the acceleration acting on the article during movement to calculate the mass of the article.

A mass measurement device according to a third aspect of the present invention is the mass measurement device according to the first or second aspect of the present invention, wherein the directions in which the force measurement unit and the acceleration measurement unit detect are directions in which gravity does not act, and are the same.

A mass measurement device according to a fourth aspect of the present invention is the mass measurement device according to the first or second aspect of the present invention, wherein the directions in which the force measurement unit and the acceleration measurement unit detect are directions in which gravity acts, and are the same.

A mass measurement device according to a fifth aspect of the present invention is the mass measurement device according to the first or second aspect of the present invention, wherein at least two sets of the force measurement unit and the acceleration measurement unit are provided. The directions in which the force measurement unit and the acceleration measurement unit detect are the same in each set, and the detection directions for each set intersect each other.

A mass measurement device according to a sixth aspect of the present invention is the mass measurement device according to the first or second aspect of the present invention, wherein the acceleration measurement unit measures acceleration that acts on the article on the basis of a run command outputted from the control unit to the movement mechanism.

This mass measurement device is not required to be provided with a physical acceleration detector, and it is therefore possible to reduce the size and weight of the device.

A mass measurement device according to a seventh aspect of the present invention is the mass measurement device according to the first or second aspect of the present invention, furthermore comprising an external monitoring device. The external monitoring device is secured in a nonmoving position and is used for monitoring the article, or the operation of the holding mechanism or the movement mechanism. The acceleration measurement unit measures acceleration that acts on the article on the basis of data obtained from the external monitoring device.

In this mass measurement device, acceleration that acts on the article is determined from data sent from a stationary external monitoring device, and accordingly there is no effect from wiring or the like due to installation of an acceleration sensor and utility is advantageous.

A mass measurement device according to an eighth aspect of the present invention is the mass measurement device according to the seventh aspect of the present invention, wherein the external monitoring device is a laser displacement gauge.

A mass measurement device according to a ninth aspect of the present invention is the mass measurement device according to the seventh aspect of the present invention, wherein the external monitoring device is a camera.

A mass measurement device according to a tenth aspect of the present invention is the mass measurement device according to the first or second aspect of the present invention, wherein a camera attached to the holding mechanism is furthermore provided. The acceleration measurement unit measures acceleration that acts on the article on the basis of a predetermined reference point externally set in advance and image data obtained from the camera.

In a conventional step for conveying an article, it is common, as means for taking an article or placing an article, to have a holding mechanism (e.g., a robot hand) with a camera mounted thereon to reach out and grip an article. Consequently, in this mass measurement device, distance data in which the holding mechanism has moved from a predetermined reference point to another predetermined reference point can be obtained on the basis of image data from the camera, and acceleration can therefore be determined from the distance data.

A mass measurement device according to an eleventh aspect of the present invention is the mass measurement device according to the first aspect, wherein at least one of an extremum of the force measurement data showing the result of the measurement made by the force measurement unit and an extremum of the acceleration data showing the result of the measurement made by the acceleration measurement unit is used in the calculation of the mass of the article.

In this mass measurement device, at least one of the extremum of the acceleration data and the extremum of the force measurement data is used when the mass of the article is calculated. Assuming that the force measurement unit and the acceleration measurement unit are both configured using sensors, the displacement distance over time in the measurement data is shortest when the measurement data of the sensors is at an extremum. Therefore, the extremum of the measurement data is used in the calculation of the mass of the article, whereby the mass of the article is calculated while mostly unaffected by phase displacement caused by the frequency characteristics of the sensors, and weighing precision is increased as a result.

The mass measurement device according to a twelfth aspect of the present invention is the mass measurement device according to the eleventh aspect, wherein a time at which the force measurement data takes on the extremum is offset from a time at which the acceleration data takes on the extremum, and both the extremum of the force measurement data and the extremum of the acceleration data are used in the calculation of the mass of the article.

In this mass measurement device, the data have extrema at mutually different times, but the extremum of the force measurement data and the extremum of the acceleration data are both used in the calculation of the mass of the article. It is thereby possible to calculate the mass of the article with greater precision.

The mass measurement device according to a thirteenth aspect of the present invention is the mass measurement device according to the eleventh aspect, wherein the time at which the force measurement data takes on the extremum is offset from the time at which the acceleration data takes on the extremum. When the extremum of the force measurement data is used for calculating the mass of the article, the value of the acceleration data at the time that the data takes on the extremum is furthermore used for calculating the mass of the article. When the extremum of the acceleration data is used for calculating the mass of the article, the value of the force measurement data at the time that the data takes on the extremum is furthermore used for calculating the mass of the article.

In this mass measurement device, the extremum of the acceleration data or the force measurement data is used, and the data of the other at that time is used. The data at the moment at which a condition is applied to the article is used, and the mass of the article can be rapidly calculated without waiting for both data to become extrema.

The mass measurement device according to a fourteenth aspect of the present invention is the mass measurement device according to any of the eleventh to thirteenth aspects, wherein the control unit extracts first data of the force measurement data, the first data corresponding to inclusion in a first predetermined range that includes the extremum of the data. The control unit extracts second data of the acceleration data, the second data corresponding to inclusion in a second predetermined range that includes the extremum of the data. The control unit furthermore preferably calculates a weighted average for the first data and the second data thus extracted, and uses the results to calculate the mass of the article. It is thereby possible to calculate the mass of the article with greater precision.

The mass measurement device according to a fifteenth aspect of the present invention is the mass measurement device according to the first aspect, wherein the control unit calculates the mass of the article using the difference between the force measurement values at two points obtained by the force measurement unit, and the difference between the acceleration measurement values at two points obtained by the acceleration measurement unit in coordination with the force measurement unit.

When the force measurement unit is a load cell and the attached angle is slightly tilted, gravity has an effect in the tilted direction of the load cell and the reference point output will vary. However, in this mass measurement device, a reference point output is unnecessary because the difference between two points of the data obtained from the force measurement unit and the difference between two points of the data obtained from the acceleration measurement unit are used. As a result, the effect of variability in the reference point output at the time mass is measured, i.e., the effect of gravity, is excluded.

The mass measurement device according to a sixteenth aspect of the present invention is the mass measurement device according to the fifteenth aspect, wherein the two points obtained by the force measurement unit are two points having a low rate of change with respect to time.

In this mass measurement device, two points having a low rate of change with respect to time are selected, and when a difference in phase of the outputs of the force measurement unit and the acceleration measurement unit occurs, the effect of the difference in phase can thereby be kept low.

The mass measurement device according to a seventeenth aspect of the present invention is the mass measurement device according to the sixteenth aspect, wherein the points at which the differential value of the output obtained by the force measurement unit is near zero are preferentially selected as the two points having the low rate of change.

The mass measurement device according to a eighteenth aspect of the present invention is the mass measurement device according to the sixteenth aspect, wherein the points at which the absolute value of the output obtained by the force measurement unit is large and the differential value is small are preferentially selected as the two points having the low rate of change.

The mass measurement device according to a nineteenth aspect of the present invention is the mass measurement device according to the fifteenth aspect, wherein the two points obtained by the force measurement unit are both extremum points.

In this mass measurement device, the extremum point of the output of the acceleration measurement unit that corresponds to the extremum point of the output of the force measurement unit is easily identified and is not liable to be affected by a difference in phase.

The mass measurement device according to a twentieth aspect of the present invention is the mass measurement device according to the fifteenth aspect, wherein the two points obtained by the force measurement unit are a maximum point and a minimum point.

In this mass measurement device, the ratio of the amount of noise (magnitude of error) with respect to the magnitude of the signal is reduced as the magnitude of the signal S is increased when the amount of noise N is constant. In this aspect, the magnitude of the signal S=[maximum value−minimum value]>[the difference in any other two points], and since the error ratio is less than taking any two other points, the precision for calculating mass is improved.

The mass measurement device according to a twenty-first aspect of the present invention is the mass measurement device according to the fifteenth aspect, wherein the difference between the force measurement values at two points obtained by the force measurement unit is a predetermined value or greater.

In this mass measurement device, the magnitude of the signal S is a predetermined value or greater. The predetermined value can be set sufficiently high with respect to the amount of the noise (magnitude of error) N, whereby the S/N ratio is increased and the precision of the calculation of mass is improved by a commensurate amount.

The mass measurement device according to a twenty-second aspect of the present invention is the mass measurement device according to the first aspect, wherein the control unit calculates the mass of the article using the difference between the acceleration measurement values at two points obtained by the acceleration measurement unit, and the difference between the force measurement values at two points obtained by the force measurement unit in coordination with the acceleration measurement unit.

When the acceleration measurement unit is a load cell and the attached angle is slightly tilted, gravity has an effect in the tilted direction of the load cell and the reference point output will vary. However, in this mass measurement device, a reference point output is unnecessary because the difference between two points of the data obtained from the acceleration measurement unit and the difference between two points of the data obtained from the force measurement unit are used. As a result, the effect of variability in the reference point output at the time mass is measured, i.e., the effect of gravity, is excluded.

The mass measurement device according to a twenty-third aspect is the mass measurement device according to the twenty-second aspect, wherein the two points obtained by the acceleration measurement unit are two points in which a rate of change with respect to time is small.

In this mass measurement device, two points having the low rate of change with respect to time are selected, and when a difference in phase of the outputs of the acceleration measurement unit and the force measurement unit occurs, the effect of the difference in phase can thereby be kept low.

The mass measurement device according to a twenty-fourth aspect of the present invention is the mass measurement device according to the first aspect, comprising a first mass measurement unit, a second mass measurement unit, and a control unit. The first mass measurement unit moves the article, and divides the force acting on the article during movement by the acceleration acting on the article during movement to calculate the mass of the article, the first mass measurement unit having the holding mechanism, the movement mechanism, the force measurement unit, and the acceleration measurement unit. The second mass measurement unit measures the mass of the article using a different scheme from that of the first mass measurement unit while the article is held in the first mass measurement unit. The control unit controls the first mass measurement unit and the second mass measurement unit. Furthermore, the control unit preferentially measures mass using the second mass measurement unit when a predetermined condition holds true.

Assuming two mass measurement devices are provided and the preferred mass measurement device is selected in accordance with conditions to measure mass, the article must be held by (shifted to) the selected device side, and work time is wasted even were the process to be automated.

However, in this mass measurement device, mass can be measured using two schemes without holding (shifting) the article again. Therefore, measurement of mass with high precision that corresponds to the production situation can be achieved and wasted work time can be eliminated.

The second mass measurement unit is a mass measurement scheme used in a common stationary state or a state of low vibration, and is used in combination with the first mass measurement unit for measuring mass that is being moved. The measurement scheme can thereby be changed in accordance with a change in the production steps, a change in product, and other changes in the production situation.

Furthermore, mass can be measured while the article is being moved, and when used in combination with an industrial robot, the inspection of mass and sorting products based on the result of inspecting the mass can be carried out on the robot side. As a result, a weight checker and a sorting device can be removed from an existing production step.

The mass measurement device according to a twenty-fifth aspect of the present invention is the mass measurement device according to the first aspect, comprising a first mass measurement unit, a second mass measurement unit, and a control unit. The first mass measurement unit moves the article and divides the force acting on the article during movement by the acceleration acting on the article during movement to calculate the mass of the article, the first mass measurement unit having the holding mechanism, the movement mechanism, the force measurement unit, and the acceleration measurement unit. The second mass measurement unit measures the mass of the article using a different scheme from that of the first mass measurement unit in coordination with the first mass measurement unit. The control unit controls the first mass measurement unit and the second mass measurement unit. Furthermore, the control unit uses a measurement value of the second mass measurement unit more preferentially than a measurement value of the first mass measurement unit when a predetermined condition holds true.

In this mass measurement device, the second mass measurement unit measures mass in coordination with the measurement of mass by the first mass measurement unit, and the measurement value can therefore be rapidly outputted after a predetermined condition holds true. As a result, mass is measured with high precision without a loss of production in the step.

The second mass measurement unit is a mass measurement scheme used in a common stationary state or a state of low vibration, and is used in combination with the first mass measurement unit for measuring mass while that is being moved. The measurement scheme can thereby be changed in accordance with a change in the production steps, a change in product, and other changes in the production situation.

Furthermore, mass can be measured while the article is being moved, and when used in combination with an industrial robot, the inspection of mass and sorting products based on the result of inspecting the mass can be carried out on the robot side. As a result, a weight checker and a sorting device can be removed from an existing production step.

The mass measurement device according to a twenty-sixth aspect of the present invention is the mass measurement device according to the twenty-fourth or twenty-fifth aspect, wherein, in the first mass measurement unit, the directions of sensitivity of the force measurement unit and the acceleration measurement unit are three mutually orthogonal directions including the vertical direction.

This mass measurement device is capable of measuring mass while an article is being moved, without restriction to the movement direction of the article, and is suitably used in combination with an industrial robot. The directions of sensitivity are directions in which sensor output is maximal when, e.g., an arbitrary force is made to act in various directions on the sensors which react to the force.

The mass measurement device according to a twenty-seventh aspect of the present invention is the mass measurement device according to the twenty-fourth or twenty-fifth aspect, wherein, in the first mass measurement unit, the directions of sensitivity of the force measurement unit and the acceleration measurement unit are sloped in a predetermined angle downward with respect to the horizontal plane.

In this mass measurement device, force and acceleration in the vertical direction and force and acceleration in the horizontal direction appear as components that correspond to the slope angle of the directions of sensitivity of the force measurement unit and the acceleration measurement unit. Consequently, force and acceleration can be measured without providing additional force measurement units and acceleration measurement units in the vertical direction and the horizontal direction.

The mass measurement device according to a twenty-eighth aspect of the present invention is the mass measurement device according to the twenty-fourth or twenty-fifth aspect, wherein, in the first mass measurement unit, the movement mechanism rotates about two mutually orthogonal axes including the vertical axis, and the directions of sensitivity of the force measurement unit and the acceleration measurement unit are any desired directions.

In this mass measurement device, force and acceleration can be measured in three mutually orthogonal directions including the vertical direction without providing additional force measurement units and acceleration measurement units.

The mass measurement device according to a twenty-ninth aspect of the present invention is the mass measurement device according to the twenty-fourth or twenty-fifth aspect, wherein the predetermined condition is that the output of the acceleration measurement unit of the first mass measurement unit be less than a predetermined value.

For example, when mass is measured while an article is being moved at low speed and at constant speed, or when mass is measured in a substantially stationary state in which the article is merely lifted, it is more reasonable to use the second mass measurement unit than to accelerate the article merely to measure the mass using the first mass measurement unit.

Advantageous Effects of Invention

In the mass measurement device according to the present invention, the mass of an article can be measured even when the article is being moved. Therefore, attaching this mass measurement device to, e.g., the distal end part of a robot hand makes it possible to measure the mass of an article while the article is being moved in conjunction with conveyance.

DESCRIPTION OF EMBODIMENTS

Embodiments of the present invention will be described below with reference to the drawings. The embodiments below are specific examples of the present invention and do not limit the technical scope of the present invention.

First Embodiment

(1) Principles of Measuring Mass

Figure 1:
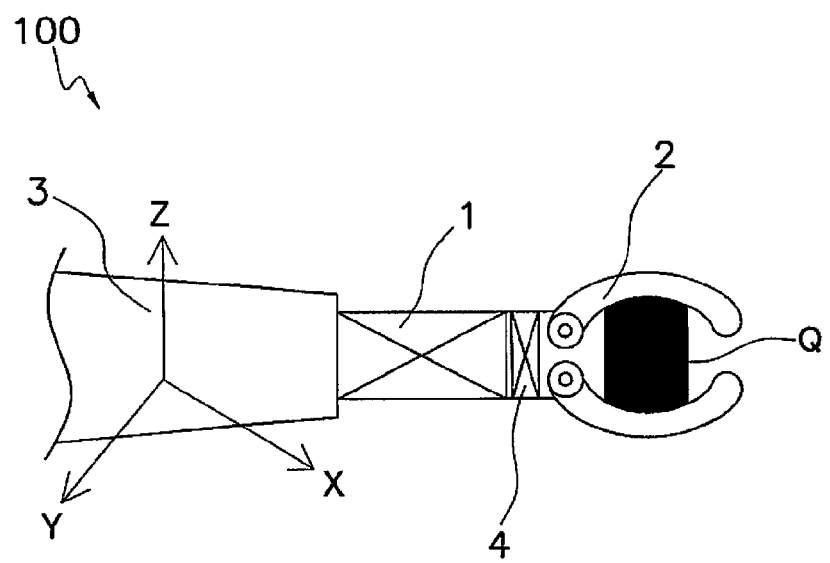
FIG. 1 is a schematic structural view of a mass measurement device.

FIG. 1 is a schematic structural view of a mass measurement device 100. In FIG. 1, a force sensor 1 detects a force that acts on a moving article. A holding mechanism 2 holds an article Q. A movement mechanism 3 moves the holding mechanism 2 in three dimensions. An acceleration sensor 4 detects acceleration that acts on the article Q. The force sensor 1 is disposed between the holding mechanism 2 and the movement mechanism 3, and the acceleration sensor 4 is disposed adjacent to the holding mechanism 2.

A strain gauge-type load cell, for example, is used as the force sensor 1. The strain gauge-type load cell has a free-end side that displaces by movement in a relative manner with respect to a fixed end side, and force that acts on the free end side can thereby be detected. The holding mechanism 2 may be a robot hand, an air chucking mechanism, or an air suctioning mechanism.

A robot arm capable of three-dimensional movement is preferred as the movement mechanism 3, and suitable examples include a horizontally multi-articulated robot and/or a perpendicular multi-articulated robot, or a parallel link robot or the like.

Suitable examples of the acceleration sensor 4 that may be used include a strain gauge-type load cell, a MEMS-type small acceleration sensor, and common commercially available acceleration sensors.

Figure 2:
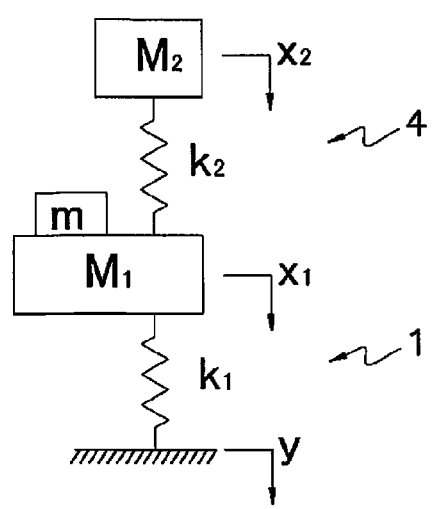
FIG. 2 is a two-degrees-of-freedom model of the mass measurement device where the mass measurement device of FIG. 1 represents a spring-mass system.

FIG. 2 is a two-degrees-of-freedom model of the mass measurement device where the mass measurement device 100 of FIG. 1 represents a spring-mass system.

In FIG. 2, m is the mass of an article Q, $M_1$ is the sum of the mass of the free end side of the force sensor 1, the mass of the holding mechanism 2, and the mass of the fixed end side of the acceleration sensor 4, $M_2$ is the mass of the free end of the acceleration sensor 4. Also, $k_1$ is the spring constant of the force sensor 1, $k_2$ is the spring constant of the acceleration sensor 4, $x_1$ is the displacement distance of the force sensor 1, and $x_2$ is the displacement distance of the acceleration sensor 4.

The movement formulas used when acceleration acts on an article Q are expressed as follows.

$$(m+M_1)d^2x_1/dt^2 = -k_1(x_1-y) + k_2(x_1-x_2) \quad (1)$$

$$M_2 d^2x_2/dt^2 = -k_2(x_2-x_1) \quad (2)$$

A modification of formula (1) produces the following.

$$m = \{-k_1(x_1-y) + k_2(x_1-x_2)\}/(d^2x_1/dt^2) - M_1 \quad (3)$$

Considering that the rigidity of the acceleration sensor 4 is high, this can be approximated as follows.

$$d^2x_1/dt^2 \approx d^2x_2/dt^2 \quad (4)$$

Consequently, the following can be derived from formulas (3) and (4).

$$m = \{-k_1(x_1-y) + k_2(x_1-x_2)\}/(d^2x_2/dt^2) - M_1 \quad (5)$$

A modification of formula (2) produces the following.

$$d^2x_2/dt^2 = -k_2(x_2-x_1)/M_2 \quad (6)$$

Therefore, the following is derived from formulas (5) and (6).

$$m = \{-k_1(x_1-y)/-k_2(x_2-x_1)\}M_2 + M_2 - M_1 \quad (7)$$

In this case, $-k_1(x_1-y)$ is the output of the force sensor 1 and $-k_2(x_2-x_1)$ is the output of the acceleration sensor 4.

Figure 3:
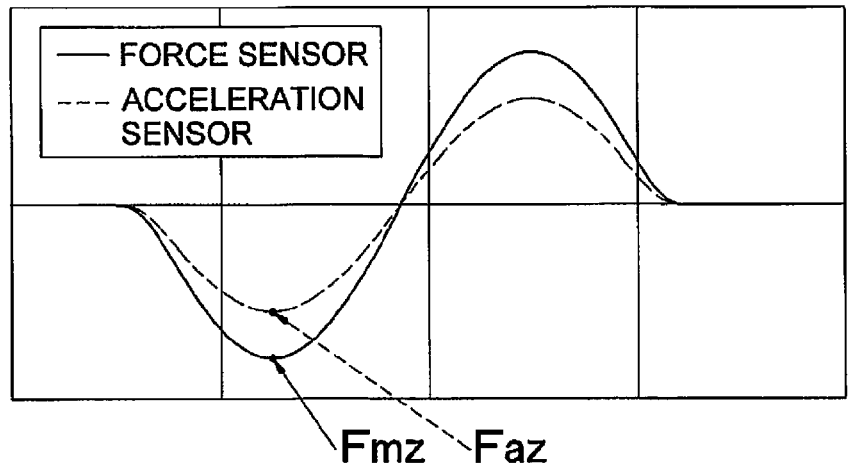
FIG. 3 is a graph showing detection signals obtained from the force sensor and the acceleration sensor in a state in which the holding mechanism is not holding anything in order to perform zero adjustment.

FIG. 3 is a graph showing detection signals obtained from the force sensor 1 and the acceleration sensor 4 in a state in which the holding mechanism 2 is not holding anything in order to perform zero adjustment. In FIG. 3, the following formula is obtained from formula (7), where Fmz is the peak value of the output of the force sensor 1, and Faz is the peak value of the output of the acceleration sensor 4.

$$0 = M_2 \cdot C \cdot (Fmz/Faz) + M_2 - M_1 \qquad (8)$$

In this formula, acceleration is assumed to be not equal to 0, and C is a conversion factor.

Figure 4:
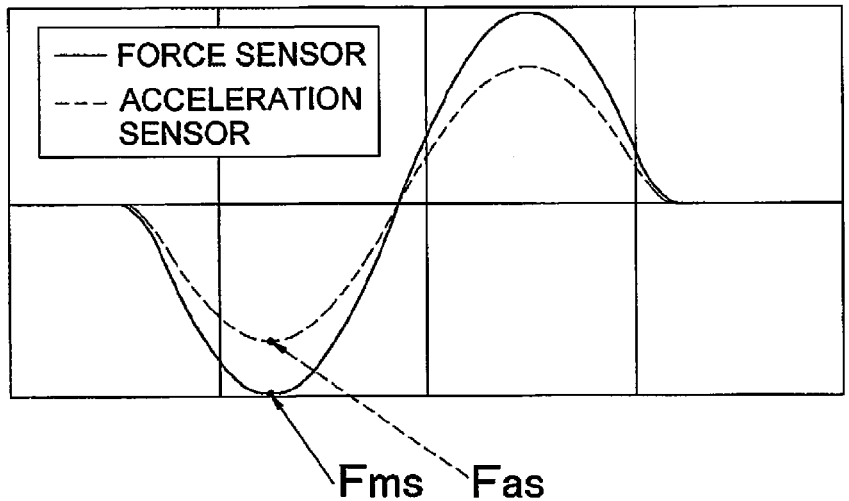
FIG. 4 is a graph showing detection signals obtained from the force sensor and the acceleration sensor in a state in which the holding mechanism is holding a known counterweight for span adjustment.

FIG. 4 is a graph showing detection signals obtained from the force sensor 1 and the acceleration sensor 4 in a state in which the holding mechanism 2 is holding a known counterweight for span adjustment. In FIG. 4, the following formula is obtained from formula (7), where ms is the span mass, Fms is the peak value of the output of the force sensor 1, and Fas is the peak value of the output of the acceleration sensor 4.

$$ms = M_2 \cdot C \cdot (Fms/Fas) + M_2 - M_1 \qquad (9)$$

Also, the following in derived from formulas (8) and (9).

$$C = ms/M_2 \{(Fms/Fas) - (Fmz/Faz)\} \qquad (10)$$

The following is obtained from formula (10), where $M_2$ is the fixed factor and S is the span factor.

$$S = C \cdot M_2 = ms/\{(Fms/Fas) - (Fmz/Faz)\} \qquad (11)$$

Figure 5:
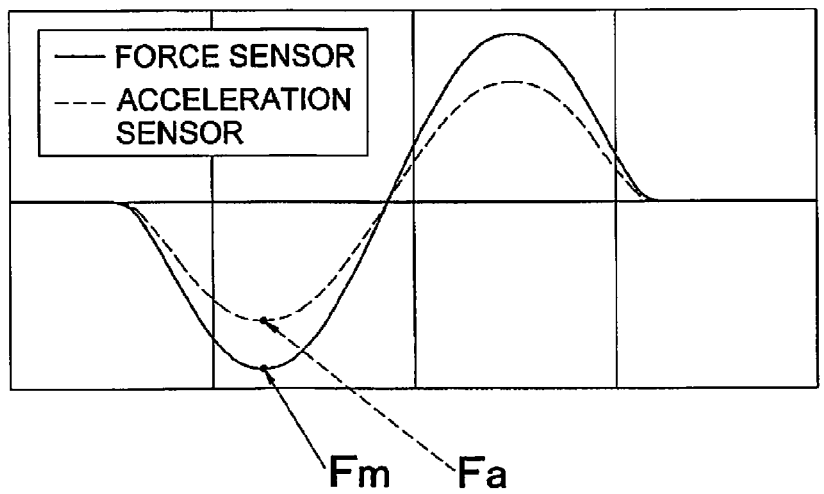
FIG. 5 is a graph showing detection signals obtained from the force sensor and the acceleration sensor in a state in which the holding mechanism is holding an object to be measured having a mass m.

FIG. 5 is a graph showing detection signals obtained from the force sensor 1 and the acceleration sensor 4 in a state in which the holding mechanism 2 is holding an object measured having a mass m. In FIG. 5, the following formula is obtained from formula (11), where Fm is the peak value of the output of the force sensor 1, and Fa is the peak value of the output of the acceleration sensor 4.

$$m = S\{(Fm/Fa) - (Fmz/Faz)\} \qquad (12)$$

(2) Specific Configuration of the Mass Measurement Device 100

(2-1) Drive System

Figure 6:
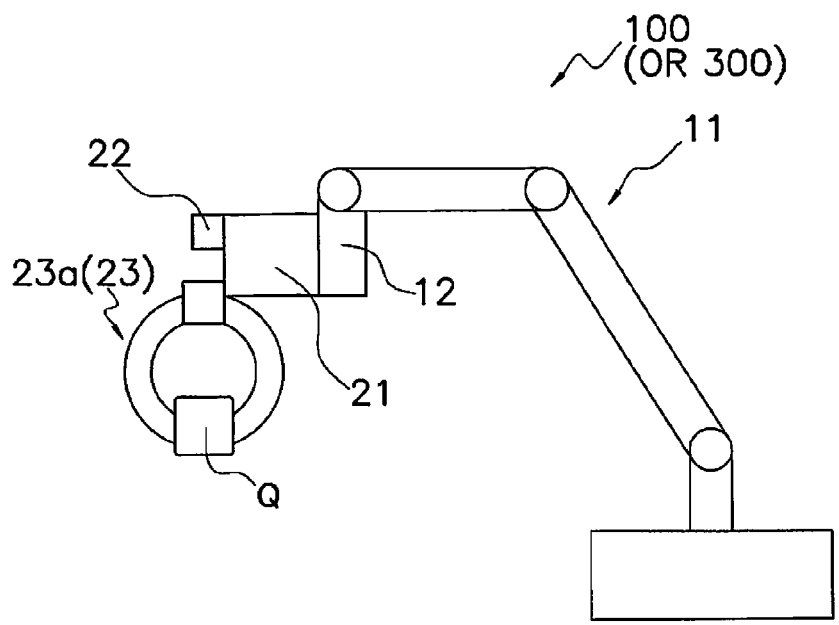
FIG. 6 is a front view of the mass measurement device according to a first embodiment of the present invention.

FIG. 6 is a front view of the mass measurement device 100 according to a first embodiment of the present invention. In FIG. 6, the mass measurement device 100 is provided with a robot arm 11, a strain gauge-type force sensor 21, an acceleration sensor 22, and a robot hand 23.

The robot arm 11 is a movement mechanism, and a horizontal multi-articulated robot HM-40703E2/J manufactured by DENSO is used. One end of the force sensor 21 is fixed to the distal-end base part 12 of the robot arm 11.

The force sensor 21 is a load cell for which a strain gauge-type load cell having a rated load of 80 kgf and a rated output of 2 mV/V is used. The acceleration sensor 22 and the robot hand 23 are disposed at the free end side of the force sensor 21. The robot hand 23 functions as a holding mechanism. A strain gauge-type load cell having a rated load of 80 kgf and a rated output of 2 mV/V is used as the acceleration sensor 22, and a 374-g metal deadweight is secured to the free end thereof.

The robot hand 23 is a holding mechanism, but in lieu thereof, it is possible to use a finger mechanism or an air chucking mechanism (or an air suctioning mechanism). The robot hand 23 shown in FIG. 2 is a finger mechanism, which is suitable for when the article Q is a solid object, and is hereinafter referred to as a robot hand 23a. The air chucking mechanism and/or the air suctioning mechanism is suitable for when the shape is not fixed, such as a bagged product.

Figure 7:
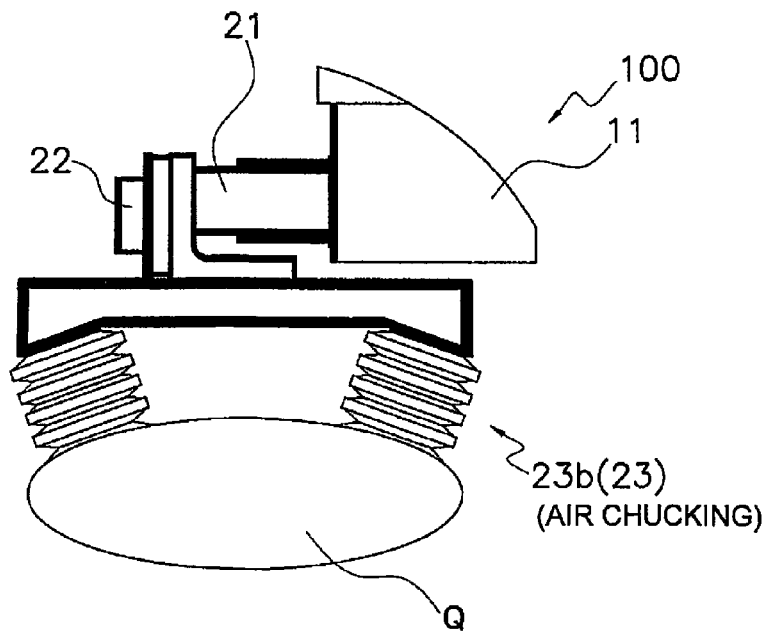
FIG. 7 is a perspective view of the air chucking mechanism.

FIG. 7 shows a perspective view of an air chucking mechanism-type robot hand 23. The robot hand 23 is an air chucking mechanism provided with four suction cups having a diameter of 40 mm formed from silicone rubber on an aluminum box, and air is drawn in from the aluminum box to thereby chuck the article Q as the measurement target using the four suction cups. In the first embodiment, an air chucking mechanism-type robot hand 23 is used, and the air chucking mechanism-type robot hand 23 will be referred to as robot hand 23b. The term robot hand 23 will be used for the case in which either a finger mechanism or an air chucking mechanism is acceptable.

A vacuum generator VPR2-10LSVEG manufactured by CKD is used for suctioning air, and dry air at 0.5 MPa is fed to the vacuum generator. Also, a 187 g metal block is used as the article Q for measurement.

In FIGS. 6 and 7, the mass of the article Q is configured so as to allow the mass of the article Q to be measured on the basis of the output of the force sensor 21 and the acceleration sensor 22 while the article Q held by the robot hand 23 is being moved by the robot arm 11.

(2-2) Control System

Figure 8:
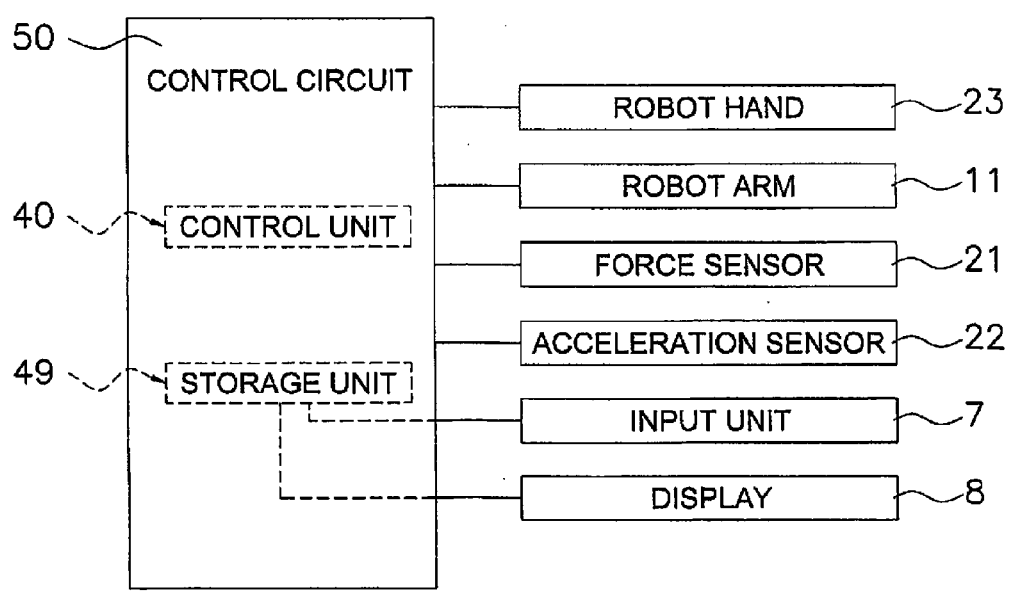
FIG. 8 is a block diagram of the control system of the mass measurement device.

FIG. 8 is a block diagram of the control system of the mass measurement device 100. In FIG. 8, the force sensor 21, the robot hand 23 as the holding mechanism, the robot arm 11 as the movement mechanism, the acceleration sensor 22, an input unit 7, and a display 8 are electrically connected to a control circuit 50 which includes a control unit 40 and a storage unit 49. The force sensor 21, robot hand 23, robot arm 11, and acceleration sensor 22 have already been described above, and therefore a description thereof is omitted.

The input unit 7 is an apparatus that an operator uses to input the rating of the force sensor 21, the measurement range of the object to be measured, and other parameters prior to startup of the mass measurement device 100, and is more specifically a keyboard or a touch panel.

The display 8 is an apparatus for sequentially displaying the operating status of the mass measurement device 100, and is used for displaying errors when abnormalities in the force sensor 21 and/or the acceleration sensor 22 or operating abnormalities in the robot hand 23 and/or the robot arm 11 have occurred.

The storage unit 49 stores in advance the rating of the force sensor 21 that can be mounted on the mass measurement device 100, and the application acceleration that is to act on the object to be measured and that is set for each mass range of the object to be measured.

For example, the operator inputs the mass measurement range (e.g., m±0.5 g) of the article Q prior to the startup of the mass measurement device 100 when the mass measurement device 100 is to perform the operations of "holding or chucking the article Q using the robot hand 23, moving the article Q to a package container using the robot arm 11, measuring the mass during the movement, and placing the article Q in the package container" in the step for conveying the article Q.

The storage unit 49 stores in advance the optimal acceleration that should act on the article Q when the mass of the article Q having a mass of about m is to be measured. The control unit 40 reads from the storage unit 49 the optimal acceleration that corresponds to the inputted mass measurement range, causes the optimal acceleration to act on the article Q via the robot arm 11, and reads the output of the force sensor 21 at that time. A digital signal processor (DSP) and/or a microcomputer, or the like is used as the control unit 40.

Figure 9:
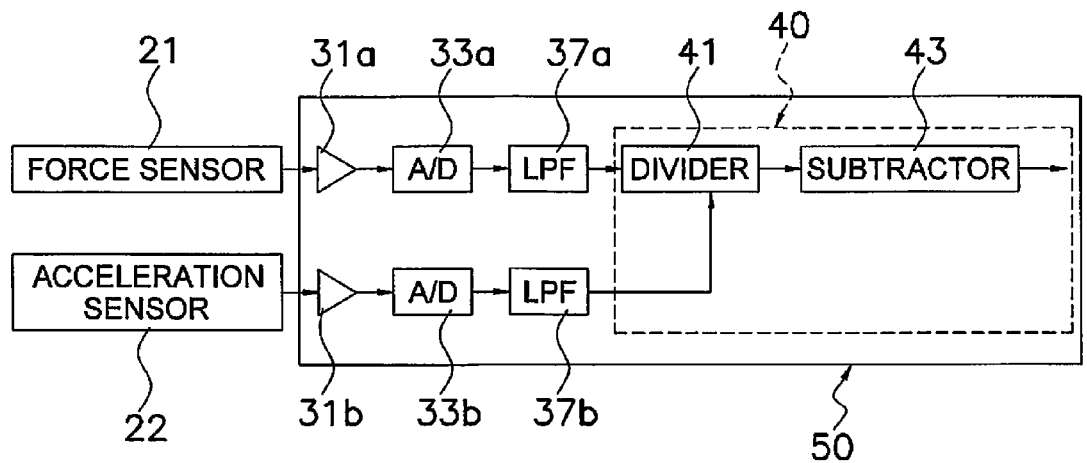
FIG. 9 is a diagram of a signal-processing circuit for processing signals detected by the force sensor and the acceleration sensor.

FIG. 9 is a diagram of a signal-processing circuit for processing signals detected by the force sensor 21 and the acceleration sensor 22. In FIG. 9, amplifiers 31a, 31b are connected to the force sensor 21 and the acceleration sensor 22, respectively, and these amplifiers 31a, 31b amplify the detection signals inputted from the force sensor 21 and the acceleration sensor 22. A/D converters 33a, 33b are connected to the amplifiers 31a, 31b, respectively. The A/D converters 33a, 33b convert inputted analog signals into digital signals.

Low-pass filters 37a, 37b are connected to the A/D converters 33a, 33b, respectively. The low-pass filters 37a, 37b remove noise components having a constant frequency or greater from the inputted detection signals. The low-pass filters 37a, 37b are connected to the control unit 40.

The control unit 40 executes various processes on the basis of the inputted detection signals. First, the control unit 40 removes noise frequency components included in the detection signals of the force sensor 21 and the acceleration sensor 22 with the aid of the low-pass filters 37a, 37b. The control unit 40 divides the detection signal of the force sensor 21, from which the noise frequency component has been removed, by the detection signal of the acceleration sensor 22 with the aid of a divider 41, and thereafter functions as a subtractor 43 to thereby compute the formula (12) using the division results, and calculate the mass m. In other words, the control unit 40 calculates the mass m of the article Q on the basis of the detection signals of the force sensor 21 and the acceleration sensor 22.

(3) Operation

The force sensor 21 and the acceleration sensor 22 are disposed in a state tilted 90 degrees with respect to the direction in which gravity acts, and the detection directions of the force sensor 21 and the acceleration sensor 22 are directions in which gravity does not act and are the same.

First, the robot arm 11 is moved at its maximum capability by a distance of 150 mm downward in the vertical direction in which gravity acts (required time: 0.25 seconds), an article Q is held or chucked at that point by the robot hand 23, and the robot arm 11 is thereafter moved at its maximum capability by a distance of 150 mm upward in the vertical direction (required time: 0.25 seconds).

Next, the robot arm 11 is moved at the maximum capability of the robot by a distance of 640 mm in the horizontal direction (required time: 0.35 seconds). Then, the robot arm 11 is again moved at the maximum capability of the robot by a distance of 150 mm downwards in the vertical direction (required time: 0.25 seconds), and the drawing in of air by the robot hand 23 is thereafter stopped and the article is released. In experimentation, the operation was repeated for 60 cycles.

Figure 10:
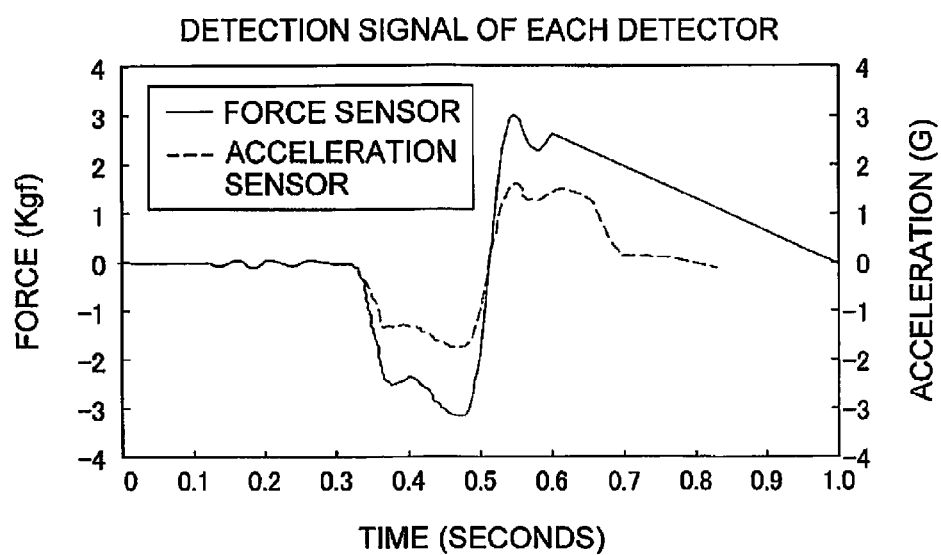
FIG. 10 is a graph showing a detection signal obtained from the load cell and the acceleration sensor.

FIG. 10 is a graph showing a detection signal obtained from the force sensor 21 and the acceleration sensor 22. In FIG. 10, the data shown by the solid line in the graph is the detection signal of the force sensor 21 and the data shown by the broken line is the detection signal of the acceleration sensor 22.

The two detection signals reflect data collection that starts at the point at which the article Q is chucked by the robot hand 23. It is apparent from the graph that effect of movement does not appear in the detection signals when the [robot arm 11] is moved in the vertical direction because the force sensor 21 and the acceleration sensor 22 are arranged in the direction in which gravity does not act, and the effect of movement appears during the movement interval in the horizontal direction.

The force that acts during movement in the horizontal direction is a maximum of about 3 kgf, and acceleration is a maximum of about 1.5 G. It is apparent from the graph that mass cannot be measured using only the detection signal of the force sensor 21 during horizontal movement.

Figure 11:
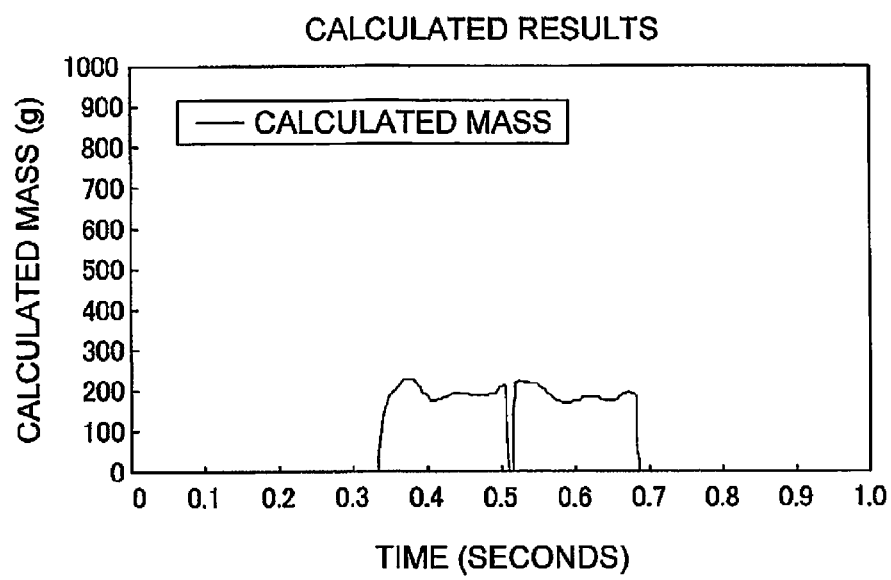
FIG. 11 is a graph showing the result of calculating mass by divisional computation based on detection signals obtained from the load cell and the acceleration sensor.

FIG. 11 is a graph showing the result of calculating mass by divisional computation based on detection signals obtained from the force sensor 21 and the acceleration sensor 22. In FIG. 11, the data shown by the solid line in the graph is the result of calculating mass. Also, it is apparent from formula (5) described above that in the mass measurement device 100, the detection signal of the force sensor 21 is divided by the detection signal of the acceleration sensor 22, but when the acceleration detection signal is 0 G, divisional computation is not possible. In view of this fact, in the present embodiment, computation is not carried out and 0 G is displayed when the acceleration detection signal is near 0 G.

It is apparent from this graph that mass is being measured while the article Q is being moved in the horizontal direction in which gravity does not act. The mass of the article Q was found to be 187.1 g as a result of using the data at 0.473 seconds in terms of the time used in the graph to calculate the mass. The average value when the operation for moving the article was repeated 60 cycles was 187.5 g with a standard deviation of 0.35 g.

(4) Characteristics (4-1)

For example, in an existing line in which products that are sent in sequential fashion from a manufacturing line are gripped by a robot hand and boxed, a weight checker for checking the content quantity of a product, and a sorting device for excluding boxes with insufficient content quantity from the line must be provided to the preceding stage.

However, with this mass measurement device 100, the mass of a product can be measured to check the correctness of the content quantity while the robot hand 23 is gripping the product and being moved. Therefore, a conventional weight checker, sorting device, or the like can be removed from an existing line.

(4-2)

Additionally, in a classification line for assorting products by rank in accordance with the mass of the product, first, there is a device for adding products to the line, then there is a weight checker or the like for measuring the mass of the added product, and lastly there is a device for classifying in accordance with the measured mass.

However, in this mass measurement device 100, all of the processes carried out by the product adding device, the weight checker, and the classification device can be carried out using a single device.

Also, the effect of gravitational acceleration can be excluded and the mass of an article can be measured because the mass of an article is measured when the article is accelerated in the horizontal direction. Consequently, it is no longer necessary to make regional gravity corrections to scales, which is performed in locations such as Japan due to gravitational differences in each region.

Second Embodiment (1) Overall Configuration of the Mass Measurement Device 200

In the first embodiment described above, the force sensor 21 and the acceleration sensor 22 are arranged so that the detection is performed in a direction in which gravity does not act; however, no limitation is imposed thereby. Described below is the case in which the detection directions of the force sensor 21 and the acceleration sensor 22 are arranged in the direction in which gravity acts.

Figure 12:
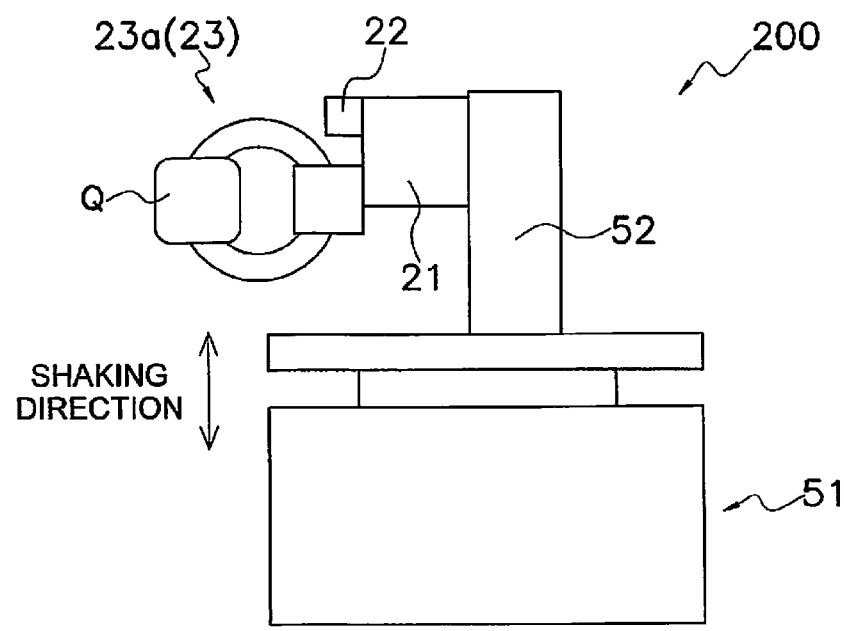
FIG. 12 is a front view of the mass measurement device according to a second embodiment of the present invention.

FIG. 12 is a front view of the mass measurement device 200 according to a second embodiment of the present invention. In FIG. 12, the mass measurement device 200 is provided with a shaker 51, a force sensor 21, an acceleration sensor 22, and a robot hand 23.

The shaker 51 is a movement mechanism for which an EV50 manufactured by IMV is used. The force sensor 21 is secured to a shaking base unit 52 of the shaker 51. A strain gauge-type load cell having a rated load of 80 kgf and a rated output of 2 mV/V is used as the force sensor 21.

The acceleration sensor 22 and the robot hand 23 are attached to the distal end of the force sensor 21. In the second embodiment, a finger mechanism-type robot hand 23a is used as the robot hand 23, and an acceleration sensor KXR94-2050 manufactured by KIONIX is used as the acceleration sensor 22. The detection directions of the force sensor 21 and the acceleration sensor 22 are the direction in which gravity acts and the sensors displace in the vertical direction.

In the adopted configuration, the mass of the article Q is measured while the force sensor 21, the acceleration sensor 22, and the article Q held by the robot hand 23a are being moved by the shaker 51.

(2) Operation

The shaker 51 operates at an acceleration amplitude of 0.5 G and a frequency of 10 Hz while the article Q is secured by the robot hand 23a, and mass is calculated during this operation. A 187 g metal block is used as the article Q for measurement of mass.

Figure 13:
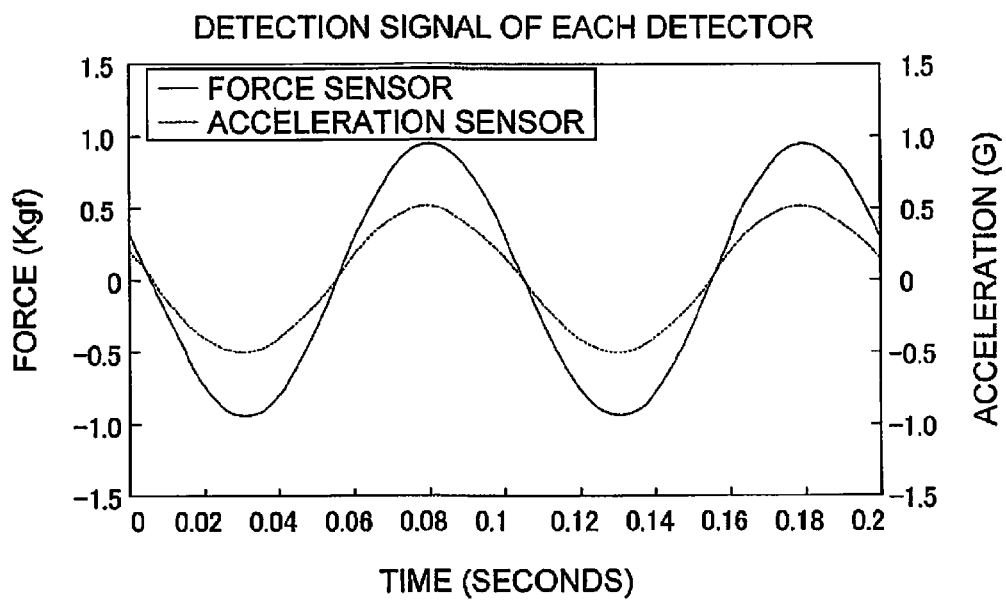
FIG. 13 is a graph showing detection signals obtained from the load cell and the acceleration sensor.

FIG. 13 is a graph showing detection signals obtained from the force sensor 21 and the acceleration sensor 22. In FIG. 13, the data shown by the solid line in the graph is the detection signal of the force sensor 21 and the data shown by the broken line is the detection signal of the acceleration sensor 22. The force acting during movement is a maximum of about 1 kgf, and the acceleration is a maximum of about 0.5 G.

Figure 14:
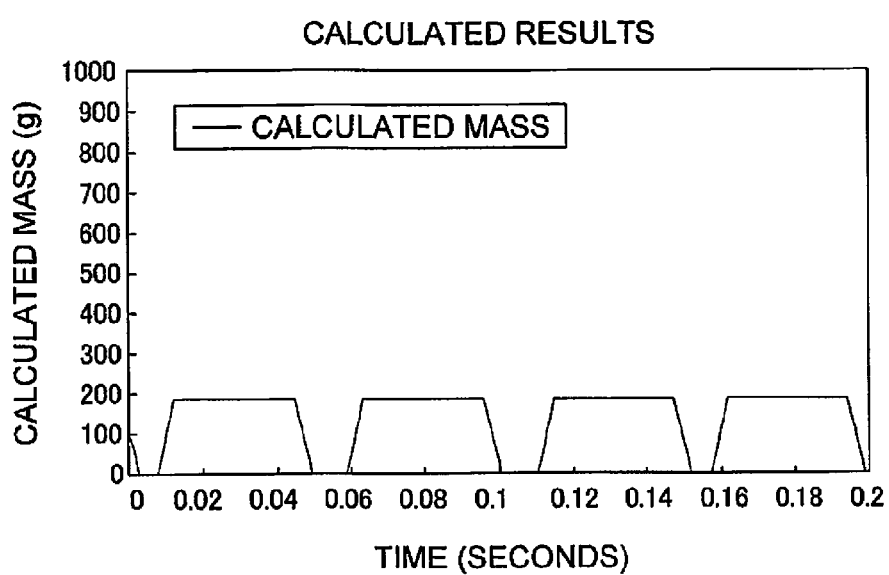
FIG. 14 is a graph showing the result of calculating mass by divisional computation on the basis of detection signals obtained from the load cell and the acceleration sensor.

FIG. 14 is a graph showing the result of calculating mass by divisional computation on the basis of detection signals obtained from the force sensor 21 and the acceleration sensor 22. The data shown by the solid line in the graph is the result of calculating mass. In this case, when the acceleration detection signal is near 0 G, computation is not carried out and 0 G is displayed in the same manner as the first embodiment described above.

As shown in the graph of FIG. 14, it is apparent that the mass is being measured even while the article Q is being moved in the vertical direction in which gravity acts. The mass of the article Q was calculated using data at points of maximum value in terms of the waveform in the graph of FIG. 13. The average value after measuring for 100 cycles was 187.2 g with a standard deviation of 0.12 g.

In summary of the above experiment results, it is apparent that the mass of an article is determined by detecting force and acceleration and carrying out computation for the component force in the horizontal direction during movement or for the component force in the vertical direction, even when, e.g., the article is being accelerated diagonally with respect to the vertical direction by the robot hand 23a.

Third Embodiment (1) Overall Configuration of the Mass Measurement Device 300

Described herein is the case in which the force sensor 21 and the acceleration sensor 22 in FIG. 6 are capable of detection in three dimensions, namely, the X, Y, and Z axis directions.

The mass measurement device 300 has one end of the force sensor 21 secured to the distal-end base part 12 of the robot arm 11, and the acceleration sensor 22 and robot hand 23 are provided to the free-end side on the side opposite from the one end. In the adopted configuration, the mass of the article Q is measured while the force sensor 21, the acceleration sensor 22, and the article Q held by the robot hand 23a are being moved by the robot arm 11.

(2) Operation

Since the force sensor 21 and the acceleration sensor 22 are capable of detection in three dimensions, the X, Y, and Z axis direction, the detection signals must therefore be combined when the mass of the article Q is to be measured.

The robot arm 11 moves in the X, Y, and Z axis directions, whereby acceleration acts on the article Q. The motion formulas used is such a case are as follows.

$$(m+M)d^2X/dt^2 = KxX \tag{13}$$

$$(m+M)d^2Y/dt^2 = KyY \tag{14}$$

$$(m+M)d^2Z/dt^2 = KzZ \tag{15}$$

Combining formulas (13), (14), and (15) yields the following formula.

$$(m+M)\{(d^2X/dt^2)^2 + (d^2Y/dt^2)^2 + (d^2Z/dt^2)^2\}^{0.5} = \{(KxX)^2 + (KyY)^2 + (KzZ)^2\}^{0.5} \tag{16}$$

From (16) above, the mass m of the article Q can be determined from the following calculation formula.

$$m = \{(KxX)^2 + (KyY)^2 + (KzZ)^2\}^{0.5} / \{(d^2X/dt^2)^2 + (d^2Y/dt^2)^2 + (d^2Z/dt^2)^2\}^{0.5} - M \tag{17}$$

Therefore, it is apparent that using detectors capable of detection in three-dimensional directions and using formula (17) make it possible to determine the mass of an article Q regardless of the movement direction, even when the article is being moved in three dimensions.

MODIFICATION EXAMPLES (1) First Modification Example

In the mass measurement device according to the first to third embodiments, acceleration is measured by an acceleration sensor, but no limitation is imposed thereby.

The control system for a multipurpose robot arm or the like controls motors for driving joints, and therefore has a feedback loop for speed and position, and furthermore calculates acceleration and inertia from operation command values to the motors.

Figure 15:
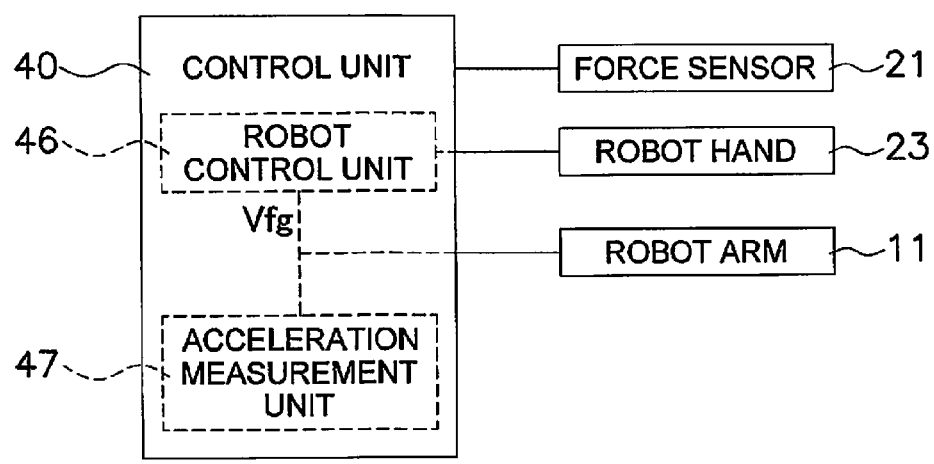
FIG. 15 is a control block diagram of the mass measurement device according to a first modification example.

For example, FIG. 15 is a control block diagram of the mass measurement device according to a first modification example. In FIG. 15, a robot control unit 46 and an acceleration measurement unit 47 are included in the control unit 40. The acceleration measurement unit 47 accepts an operation command value Vfg outputted from the robot control unit 46 to the robot arm 11 and calculates acceleration.

Consequently, in the mass measurement device according to the first modification example, a physical acceleration sensor is not required to be provided and the size and weight of the device can be reduced.

(2) Second Modification Example

In the mass measurement device according to the first to third embodiments described above, the acceleration sensor moves together with the article, but no limitation is imposed thereby, and other acceleration detection means may be arranged in a predetermined stationary position.

Figure 16:
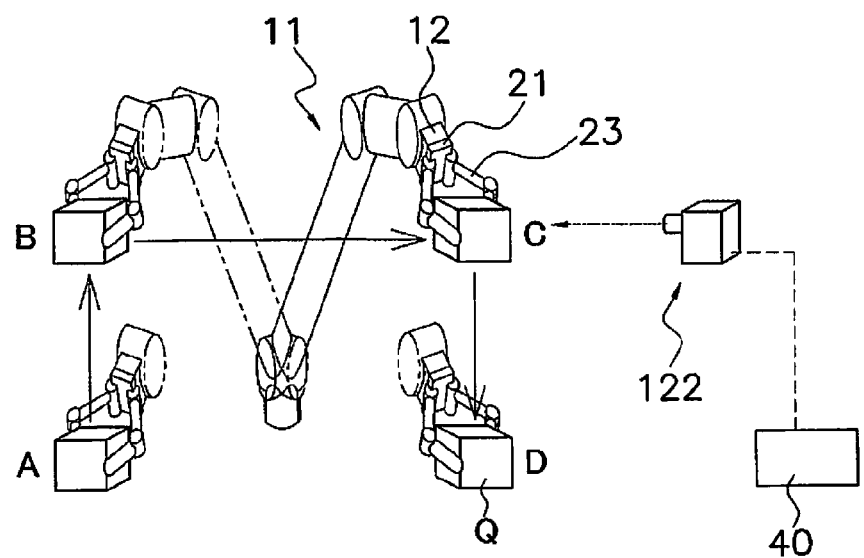
FIG. 16 is a perspective view of the mass measurement device according to a second modification example.

For example, FIG. 16 is a perspective view of the mass measurement device according to the second modification example. In FIG. 16, the A position is a position where the robot hand 23 takes the article Q, and the D position is the position where the robot hand 23 places the article Q. The robot arm 11 performs a formatted operation of causing the article Q "to ascend vertically from the A position to the B position, then move horizontally from the B position to the C position, and thereafter descend vertically from the C position to the D position."

An external monitoring device 122 monitors the movement distance of the article Q, which moves from the B position to the C position. The external monitoring device 122 is an apparatus capable of measuring the displacement distance of the article Q per unit of time, and is preferably a laser displacement gauge or a camera.

In the mass measurement device according to the second modification example, the acceleration measurement unit is composed of the external monitoring device 122 and the control unit 40, and the control unit 40 calculates acceleration that acts on the article Q on the basis of data sent from the external monitoring device 122. The force sensor 21 is secured to the distal-end base part 12 in the same manner as in the first embodiment.

In accordance with the second modification example, the acceleration that acts on the article Q is determined from the data from the distal-end base part 12 in a stationary state, and accordingly there is no effect from wiring or the like due to installation of an acceleration sensor and engineering utility is advantageous.

The external monitoring device 122 is not limited to monitoring the movement distance of the article Q, and may also monitor the movement distance of a predetermined position on the robot arm 11, or the movement distance of the robot hand 23.

(3) Third Modification Example

In a step for conveying an article, there is more widespread use of a configuration in which a robot hand with a camera mounted thereon reaches out and grips an article as means for taking an article or placing an article. Since the data about the distance that the robot hand has moved from a predetermined reference point per unit of time can be obtained on the basis of image data from the camera, acceleration can also be determined from the image data.

Figure 17:
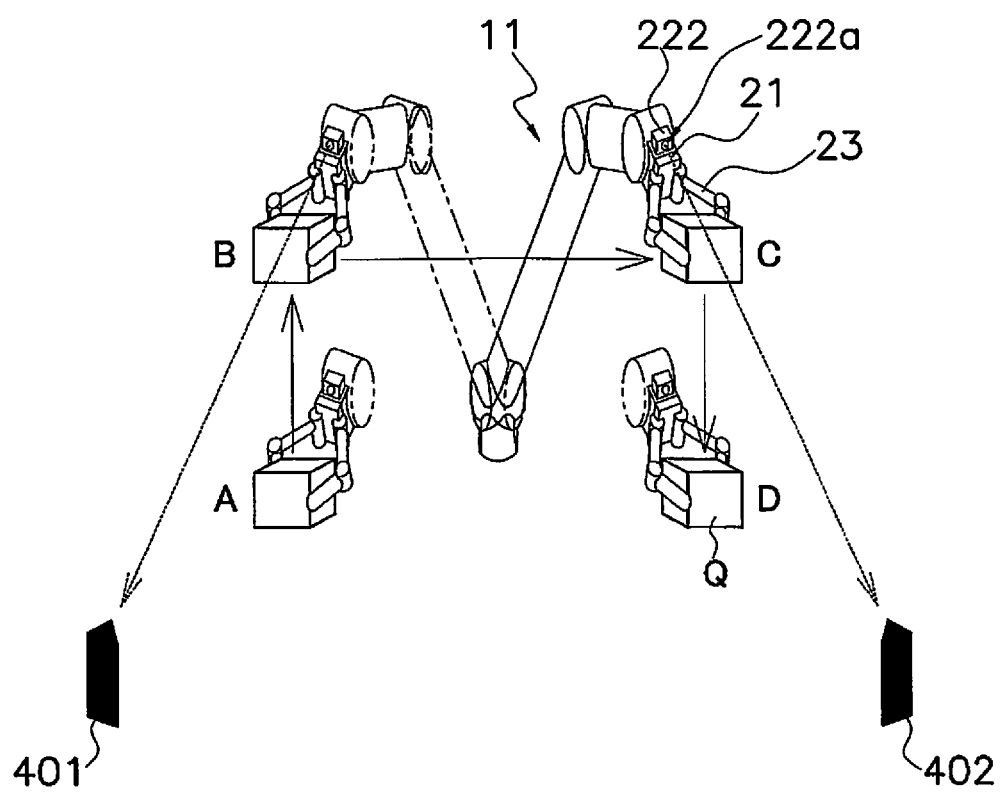
FIG. 17 is a perspective view of the mass measurement device according to a third modification example.

For example, FIG. 17 is a perspective view of the mass measurement device according to the third modification example. In FIG. 17, a camera 222 is installed on the upper part of the distal-end base part 12 of the robot arm 11. Ordinarily, the camera 222 is a camera for detecting the position where the robot hand 23 takes or places the article Q.

In the mass measurement device according to the third modification example, the acceleration measurement unit is composed of the camera 222 and the control unit 40. As shown in FIG. 17, a first object 401 as a measurement reference point is arranged in front of a lens 222a of the camera 222 in the A position and B position of the article Q. Also, a second object 402 as a measurement reference point is arranged in front of a lens 222a of the camera 222 in the C position and D position of the article Q.

The control unit 40 constituting a portion of the acceleration measurement unit calculates, on the basis of the image data sent from the camera 222, the time data until the second object 402 is recognized after, e.g., the camera 222 recognizes the first object 401, and on the basis thereof, calculates the acceleration that acts on the article Q.

As described above, in accordance with the mass measurement device according to the third embodiment, an acceleration sensor is not required to be newly provided, and acceleration that acts on the article Q can be measured using an existing camera.

Fourth Embodiment

In the mass measurement device according to the first embodiment, force that acts on an article moving horizontally is measured by the force sensor, acceleration that acts on the article moving horizontally is measured by the acceleration sensor, and the mass of the article is calculated on the basis of the measurement data of these sensors.

However, the force sensor and the acceleration sensor have different frequency characteristics. There are cases in which these frequency characteristics produce a phase offset in relation to the measurement data of the sensors, and this negatively affects the calculation of the mass of the article. As a result, the calculated mass of the article tends to be different from the actual mass of the article.

Described below as a fourth embodiment is a mass measurement device capable of measuring the mass of an article with good precision while the article is being moved and with little effect from the frequency characteristics of the sensors.

(1) Configuration of the Mass Measurement Device 100B (1-1) Drive System

Figure 18:
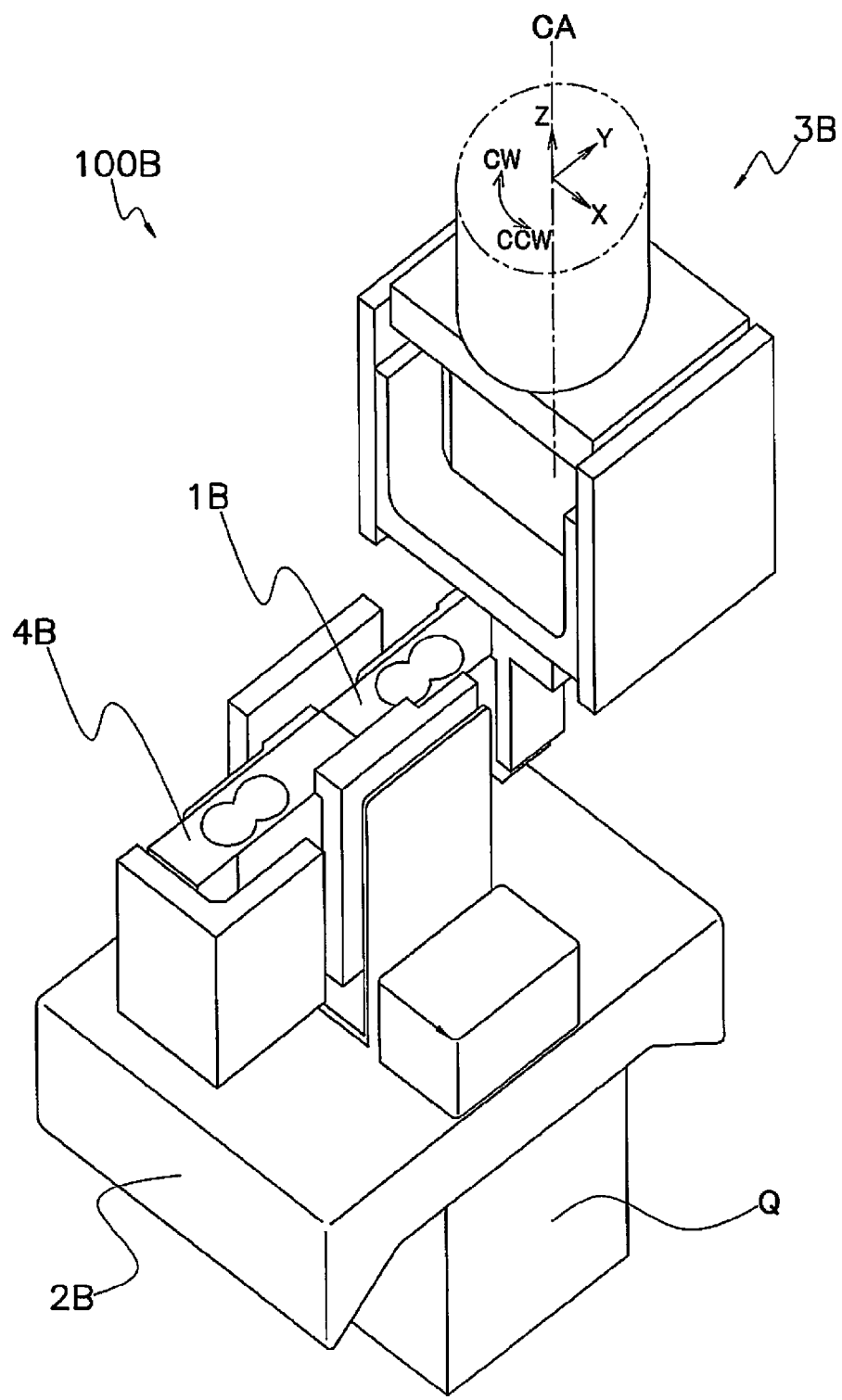
FIG. 18 is schematic structural view of the mass measurement device according to a fourth embodiment of the present invention, and is particularly a view showing the drive system of the mass measurement device.

FIG. 18 is schematic structural view of the mass measurement device 100B according to an embodiment of the present invention, and is particularly a view showing the drive system of the mass measurement device 100B. In FIG. 18, the mass measurement device 100B is provided with a force sensor 1B, a chucking unit 2B (corresponding to the holding mechanism), a robot arm 3B (corresponding to the movement mechanism), and an acceleration sensor 4B.

The force sensor 1B detects the force acting on the article Q during movement. A strain gauge-type load cell, for example, is used as the force sensor 1B. The strain gauge-type load cell has a free end side that displaces in a relative manner with respect to a fixed end side, and force that acts on the free end side can thereby be detected.

The chucking unit 2B holds the article Q. An air chucking mechanism or an air suction mechanism is used as the chucking unit 2B. The chucking unit 2B is not limited to being an air chucking mechanism or an air suction mechanism, and may be a motor-driven finger mechanism.

The robot arm 3B moves the chucking unit 2B in three dimensions. The robot arm 3B is also capable of rotating in the CW direction and the CCW direction about a predetermined rotational axis CA. Suitable examples of the robot arm 3B include a horizontally multi-articulated robot and/or a perpendicular multi-articulated robot, or a parallel link robot or the like.

The acceleration sensor 4B detects acceleration acting on the article Q. Suitable examples of the acceleration sensor 4B that may be used include a strain gauge-type load cell, a MEMS-type small acceleration sensor, and common commercially available acceleration sensors.

The force sensor 1B is provided between the chucking unit 2B and the robot arm 3B, and the acceleration sensor 4B is provided so as to be adjacent to the chucking unit 2B. In the embodiments described hereinbelow, the force sensor 1B and the acceleration sensor 4B are strain gauge-type load cells, and the force sensor 1B and the acceleration sensor 4B detect force and acceleration acting on the article Q being moved in the horizontal direction.

Figure 19:
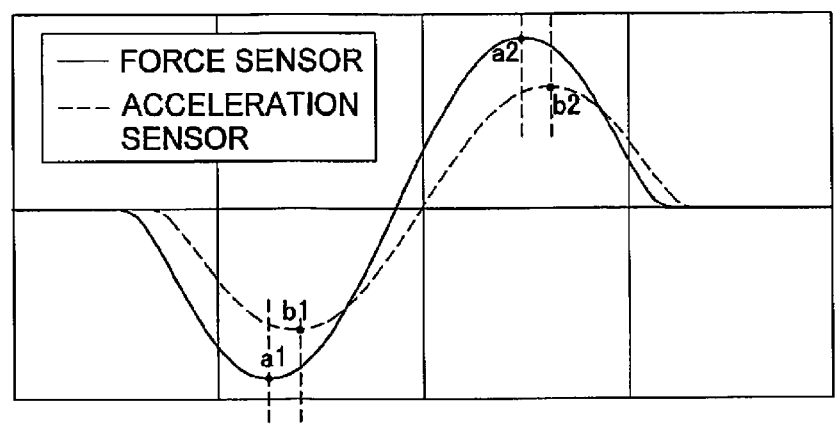
FIG. 19 is a graph showing measurement data with differences in phase, the data being used for specifically describing the method for calculating the mass m of an article Q.

(2) Means for Determining a Mass m Regardless of the Frequency Characteristics of the Force Sensor 1B and the Acceleration Sensor 4B FIG. 19 shows measurement data of the force sensor 1B and the acceleration sensor 4B when the phases have become offset. The vertical axis in FIG. 19 represents the force acting on the article Q as indicated by the value of the force measurement data, and the acceleration of the article Q as indicated by the value of the acceleration data. The horizontal axis represents time.

Depending on the frequency characteristics of the force sensor 1B and the acceleration sensor 4B, a phase difference occurs between the force measurement data and the acceleration data, as shown in FIG. 19, and as a result, the time at which the force measurement data takes on an extremum and the time at which the acceleration data takes on an extremum are mutually different.

In view of the above, the control unit 40 of the mass measurement device 100B according to the present embodiment uses the extremum of the force measurement data of the force sensor 1B and/or the extremum of the acceleration data of the acceleration sensor 4B to calculate the mass m of the article Q in the manner described above in the principles of measuring mass. In the present embodiment, the extremum of the force measurement data and the extremum of the acceleration data are both used for calculating the mass m of the article Q.

Specifically, in FIG. 19, the force measurement data of the force sensor 1B has two extrema, namely, an extremum a1 at which the force acting on the article Q is maximum when the article Q is accelerating in the horizontal direction, and an extremum a2 at which the force acting on the article Q is maximum when the article is conversely decelerating. The acceleration data of the acceleration sensor 4B has two extrema, namely, an extremum b1 at which the amount of acceleration of the article Q is maximum when the article Q is accelerating in the horizontal direction, and an extremum b2 at which the amount of acceleration acting on the article Q is maximum when the article is conversely decelerating. In this case, possible combinations of the force measurement data and the acceleration data that the mass measurement device 100B may be used for calculating the mass m of the article Q include the extremum a1 of the force measurement data and the extremum b1 of the acceleration data, and the extremum a2 of the force measurement data and the extremum b2 of the acceleration data.

When the mass m of the article Q is to be calculated in this manner, the control unit 40 stores all of the force measurement data of the force sensor 1B and the acceleration data of the acceleration sensor 4B in the storage unit (not shown) when the article Q is being moved in the horizontal direction. The control unit 40 extracts from all the data thus stored a combination of the force measurement data and the acceleration data in which both are at an extremum, and calculates the mass m of the article Q using the combination in the principles of measuring mass described above.

In this manner, when the measurement data of the force sensor 1B and the acceleration sensor 4B take on extrema, the displacement distance over time in the measurement data is shortest even were the force sensor 1B and the acceleration sensor 4B to have frequency characteristics. Accordingly, the extrema of the measurement data of the force sensor 1B and the acceleration sensor 4B are used for calculating the mass m of the article Q, whereby the control unit 40 can determine the mass m of the article Q with good precision while the calculation remains relatively unaffected when the phases in the measurement data become offset due to the frequency characteristics.

In the extrema of the measurement data described above, the measurement data near the extrema, i.e., the measurement data of approximate extrema are also included.

(3) Characteristics (3-1)
The mass measurement device 100B according to the present embodiment uses the extremum of the acceleration data and/or the extremum force measurement data when calculating the mass m of the article Q. When the measurement data of the force sensor 1B and/or the acceleration sensor 4B takes on an extremum, the displacement distance over time in the data is shortest. Therefore, the extrema in the measurement data of the force sensor 1B and the acceleration sensor 4B are used for calculating the mass m of the article Q, whereby the mass m of the article Q can be calculated with good precision while [the calculation] remains relatively unaffected when the phases in the measurement data become offset due to the frequency characteristics, and weighing precision is enhanced as a result.

(3-2)
In the particular case shown in FIG. 19, the force measurement data and the acceleration data have extrema at mutually different times, and the control unit 40 according to the present embodiment uses both the extremum in the force measurement data and the extremum in the acceleration data to calculate the mass m of the article Q. It is thereby possible to calculate the mass m of the article Q with greater precision.

(4) Modification Examples (4-1) First Modification Example
Described in the embodiments above is the case in which both the extremum in the force measurement data of the force sensor 1B and the extremum in the acceleration data of the acceleration sensor 4B are used when the mass m of the article Q is calculated. However, the force measurement data and the acceleration data used for calculating the mass m of the article Q may be the extremum of either one.

In other words, when the extremum of the force measurement data is to be used, the extremum of the force measurement data and the value of the acceleration data at the time the force measurement data takes on the extremum are used for calculating the mass m of the article Q. Conversely, when the extremum of the acceleration data is to be used, the extremum of the acceleration data and the value of the force measurement data at the time the acceleration data takes on the extremum are used for calculating the mass m of the article Q. Specifically, in FIG. 20, the force measurement data of the force sensor 1B takes on extrema a3, a5 at time t3 and time t5, and the acceleration data of the acceleration sensor 4B takes on extrema b4, b6 at time t4 and time t6. In view of the above, when the force measurement data takes on an extremum, the control unit 40 uses a combination of the extremum a3 in the force measurement data and the value b3 in the acceleration data at time t3, or uses a combination of the extremum a5 in the force measurement data and the value b5 in the acceleration data at time t5 to calculate the mass m of the article Q.

When the acceleration data takes on an extremum, the control unit 40 uses a combination of the value a4 in the force measurement data and the extremum b4 in the acceleration data at time t4, or uses a combination of the value a6 in the force measurement data and the extremum b6 in the acceleration data at the time t6 to calculate the mass m of the article Q.

Figure 20:
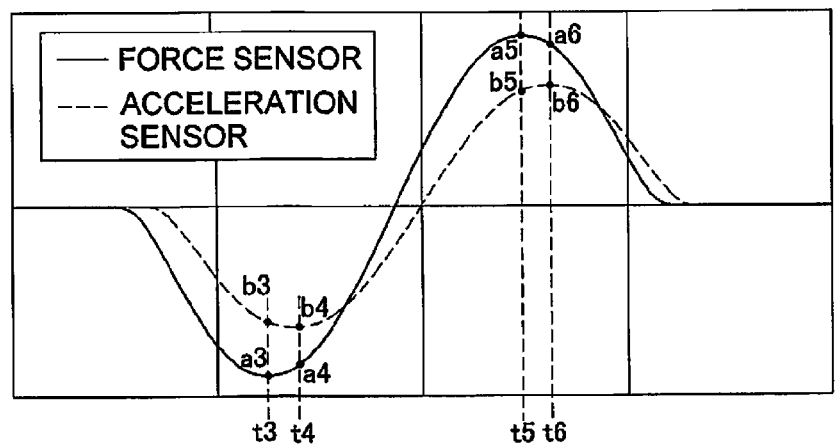
FIG. 20 is a graph showing measurement data of the force sensor and the acceleration sensor, the data being used for specifically describing the method for calculating the mass m of the article Q in accordance with the first modification example of the fourth embodiment.

In FIG. 20 as well, in the same manner as FIG. 19, the vertical axis in FIG. 20 represents the force acting on the article Q as indicated by the value of the force measurement data, or the acceleration of the article Q as indicated by the value of the acceleration data. The horizontal axis represents time.

The precision for calculating the mass m of an article Q is thereby reduced in comparison with the cases of the embodiments described above, the data at the moment at which the condition is applied to the article Q is used, and the mass measurement device 100B can thereby calculate the mass m of the article Q without waiting for the both data to become extrema. Therefore, the mass m of the article Q is rapidly calculated in comparison with the cases of the embodiments described above while a certain level of weighing precision is maintained, because the extremum in the measurement data of the force sensor 1B or the acceleration sensor 4B is used for calculating the mass m of the article Q.

(4-2) Second Modification Example

In the embodiments and first modification example described above, the control unit 40 may furthermore take the weighted average of a plurality of force measurement data and acceleration data within a fixed threshold that includes the extremum, and use the results to calculate the mass m of the article Q described in the principles of measuring mass above.

Figure 21:
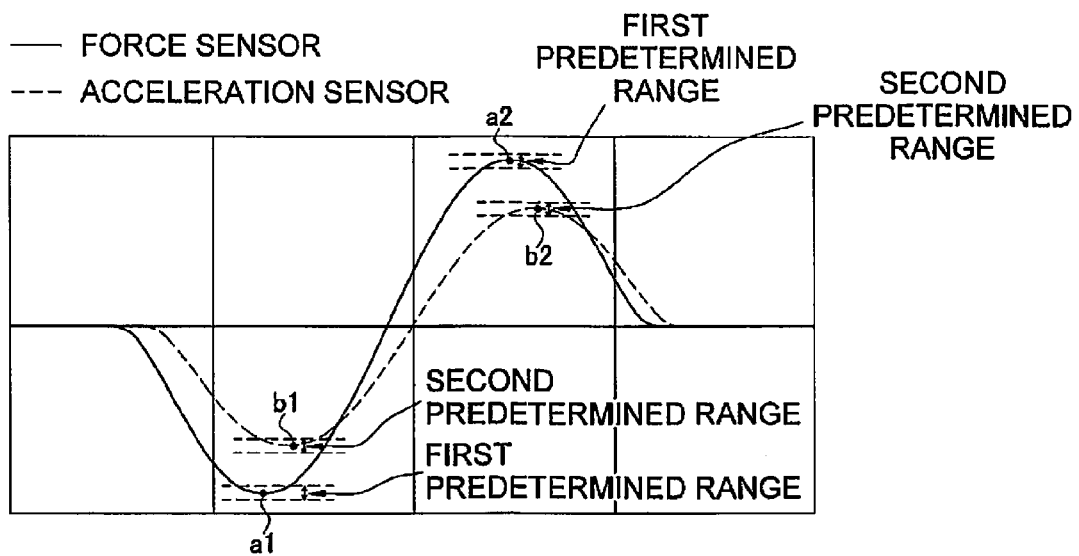
FIG. 21 is a graph showing measurement data of the force sensor and the acceleration sensor, the data being used for specifically describing the method for calculating the mass m of the article Q in accordance with the second modification example of the fourth embodiment.
Figure 22:
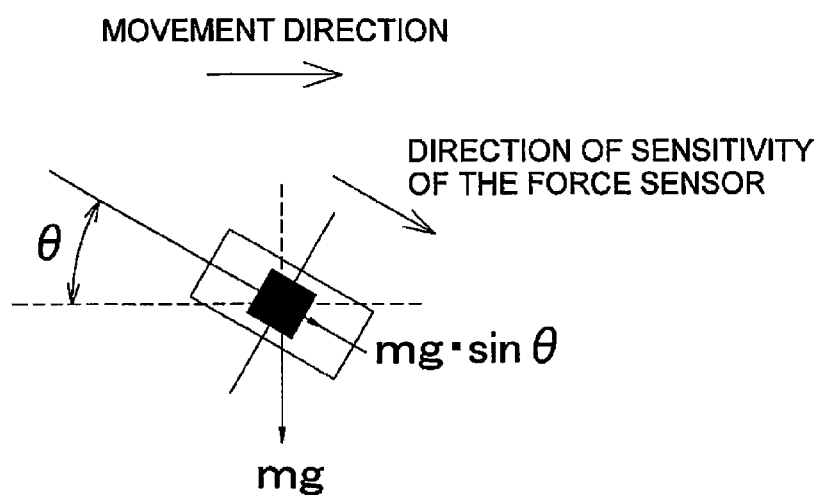
FIG. 22 is a schematic view representing the direction of component forces of gravity when the force sensor is attached in a sloped state at an angle 9 with respect to the horizontal.

Specifically, the control unit 40 extracts, from the force measurement data of the force sensor 1B, data (hereinafter referred to as first data) that corresponds to being within a first predetermined range that includes the extremum a1 or the extremum a2 of the data, as shown in FIG. 21. Also, the control unit 40 extracts, from the acceleration data of the acceleration sensor 4B, data (hereinafter referred to as second data) that corresponds to being within a second predetermined range that includes the extremum b1 or the extremum b2 of the data, as shown in FIG. 21. The control unit 40 then calculates the weighted average for the extracted first data and second data, and preferably uses the results for calculating the mass m of the article Q. It is thereby possible to calculate the mass m of the article Q with greater precision.

In FIG. 21 as well, in the same manner as FIGS. 19 and 20, the vertical axis in FIG. 21 represents the force acting on the article Q as indicated by the value of the force measurement data, or the acceleration of the article Q as indicated by the value of the acceleration data. The horizontal axis represents time.

Here, it is preferred that the first predetermined range be set so that the extremum of the force measurement data is necessarily included, and the second predetermined range be set so that the extremum of the acceleration data is necessarily included. The first predetermined range and the second predetermined range are established, as appropriate, by computation in advance, simulation, experimentation, or another method in accordance with the specifications of the like of the mass measurement device 100B (specifically, the robot arm 3B and/or the force sensor 1B and acceleration sensor 4B).

The first predetermined range and the second predetermined range may be established so as to have a predetermined width around the extrema of the data after all of the measurement data has been taken into the storage unit (not shown) while the article Q is actually being moved in the horizontal direction. In this case, the control unit 40 extracts the measurement data included in the first predetermined range and second predetermined range thus established to obtain a weighted average, and the results thereof are used for calculating the mass m of the article Q.

The weighted average may be obtained for only one of the extrema among the extrema a2, b2 on the upper side or the extrema a1, b1 on the lower side of the measurement data in FIG. 21.

The control unit 40 may also obtain a weighted average in which the weighting of the first data and the second data, which include the extrema a2, b2 on the upper side in FIG. 21, is made greater, or in which the weighting of the first data and the second data, which include the extrema a1, b1 on the lower side in FIG. 21, is reduced.

(4-3) Third Modification Example

In the fourth embodiment, the mass measurement device 100B was described as being provided with an "acceleration sensor 4B" as an apparatus for ascertaining the acceleration of an article Q that is being moved. However, it is also possible to ascertain the acceleration of the article Q being moved from, e.g., a drive command outputted to the robot arm 3B in lieu of actually detecting the acceleration from the acceleration sensor 4B. In this case, the mass measurement device 100B is not required to be provided with the acceleration sensor 4B, and the extremum in the force measurement data of the force sensor 1B and the acceleration ascertained from the drive command are used when the mass m of the article Q is to be calculated.

Fifth Embodiment

In the case of the mass measurement devices according to the first to fourth embodiments, the component force of the gravity acting on the article in the tilt direction of the force sensor appears in the output of the force sensor when the force sensor is attached in a tilted manner.

An object of the mass measurement device according to the fifth embodiment is to remove the component force of gravity included in the output of the force sensor. The fifth embodiment is described below.

The basic configuration of the fifth embodiment is the same as that of the fourth embodiment, and the terms and reference numerals for each unit in the fifth embodiment are therefore the same as those in the fourth embodiment.

(1) Effect of Gravity Acting on the Article Q

The force sensor 1B described in the principles for measuring mass above is attached so that the direction of sensitivity is horizontal, and the effect of gravity therefore does not appear in the output during horizontal movement. However, the force sensor 1B is not easily attached so that the direction of sensitivity is precisely horizontal, and the force sensor is attached with a certain amount of slope.

Figure 23A:
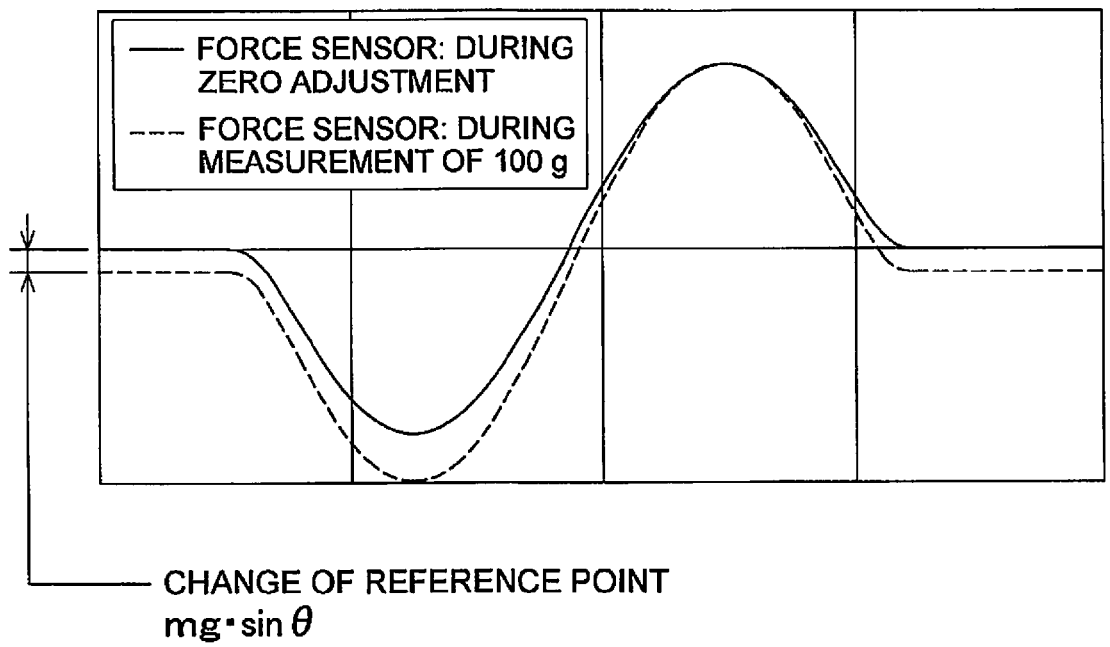
FIG. 23A is a graph showing a detection signal obtained from the force sensor attached in a sloped state at an angle 9 with respect to the horizontal.

FIG. 21 is a graph showing the direction of the component force of gravity when the force sensor 1B has been attached in a sloped state at an angle $\theta$ with respect to the horizontal. FIG. 23A is a graph showing a detection signal obtained from the force sensor 1B attached in a sloped state at an angle $\theta$ with respect to the horizontal.

In FIGS. 21 and 23A, the force sensor 1B is tilted at an angle only $\theta$ with respect to the horizontal, and the component force of gravity (mg·sin $\theta$) that acts on the article Q appears in the output of the force sensor 1B when the chucking unit 2B holds an article Q having a mass m. As a result, the reference point of the output obtained from the force sensor 1B, when the article Q is held and moved horizontally, changes in the negative direction by mg·sin θ with respect to the output obtained from the force sensor 1B when the chucking unit 2B has moved horizontally without holding the article Q, as shown in FIG. 23A.

For example, when the mass m of the article Q is calculated by dividing the peak value of the output of the force sensor 1B by the peak value of the output of the acceleration sensor 4B, the peak value of the output of the force sensor 1B as viewed from the reference point includes the component force of gravity (mg·sin θ), and the mass m of the article Q is not accurately measured.

(2) Means for Eliminating the Effect of Gravity Acting on the Article Q

In formula (12) noted above, the mass m is calculated from the output ratio [Fm/Fa] between the peak value Fm of the output of the force sensor 1B and the peak value Fa of the output of the acceleration sensor 4B, but the [Fm/Fa] portion of formula (12) holds true even when the portion is the ratio between the difference of output values of the force sensor 1B at any two points and the difference of output values at two points for the acceleration sensor 4B operating in coordination therewith. The basis for this is described below.

Figure 23B:
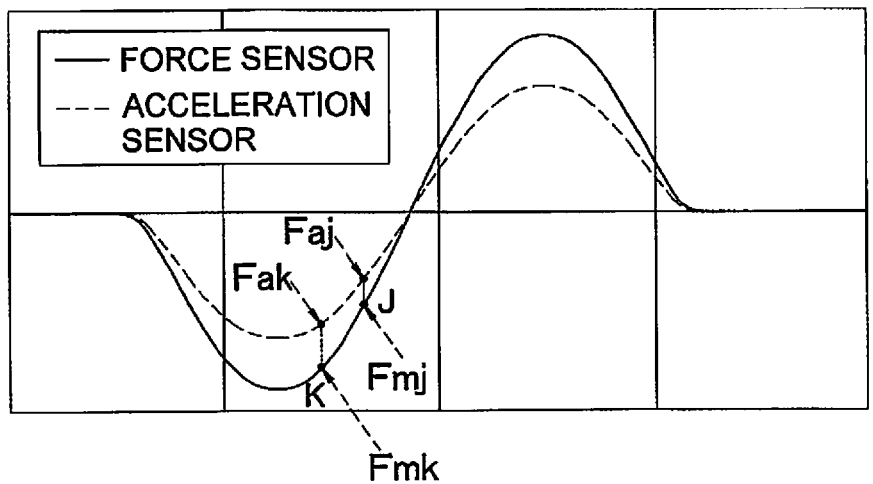
FIG. 23B is a graph showing any two points of detection signals obtained from the force sensor and the acceleration sensor.

FIG. 23B is a graph showing any two points of the detection signals obtained from the force sensor 1B and the acceleration sensor 4B. In other words, formula (12) holds true even at any two points K, J shown in FIG. 23B. As shown in FIG. 23B, the output of the force sensor 1B at the two points K and J are FmK and Fmj, respectively, and the output of the acceleration sensor 4B obtained in coordination with the force sensor 1B is Fak and Faj, respectively. Since formula (12) holds true even at the two points K, J, the following formula holds true, $$Fmk/Fak = Fmj/Faj = M \quad (18)$$

where M is the ratio of the output value of the force sensor 1B and the output value of the acceleration sensor 4B operating in coordination therewith. Formula (18) can be modified in the following manner.

$$M \cdot Fak = Fmk \quad (19)$$

$$M \cdot Faj = Fmj \quad (20)$$

The following is obtained from formulas (19) and (20).

$$M \cdot (Fak - Faj) = Fmk - Fmj \quad (21)$$

Formula (21) can be modified as follows.

$$M = (Fmk - Fmj)/(Fak - Faj) \quad (22)$$

Therefore, the [Fm/Fa] portion of formula (18) may be the ratio between the difference of output values of the force sensor 1B at any two points and the difference of output values at two points for the acceleration sensor 4B operating in coordination therewith.

For example, where Fmkg, Fmjg are the values of when the output values of the force sensor 1B at any two points K, J include the force component of gravity, the output values for when the component force of gravity is not included are Fmk, Fmj in FIG. 23B (9B), and therefore Fmkg=Fmk+mg·sin θ and Fmjg=Fmj+mg·sin θ.

Since Fmkg−Fmjg=Fmk+mg·sin θ−(Fmj+mg·sin θ), the term mg·sin θ is offset, and Fmkg−Fmjg=Fmk−Fmj. In other words, the difference between two points of the output obtained from the force sensor 1B is used and mass can thereby be calculated without determining a reference point output, even when the component force of gravity (mg·sin θ) is not included in the output values of the force sensor 1B.

However, when the values of the output are at two proximal points, the ratio of the magnitude of error with respect to the magnitude of signal increases, and there is a possibility that the precision for calculating mass will be reduced. In view of this possibility, it is preferred that possible output patterns of the force sensor 1B be envisioned and that two optimal points be selected for each output pattern. The two optimal points for each output pattern are described below.

(2-1) Two Points Having a Low Rate of Change with Respect to Time

Figure 24:
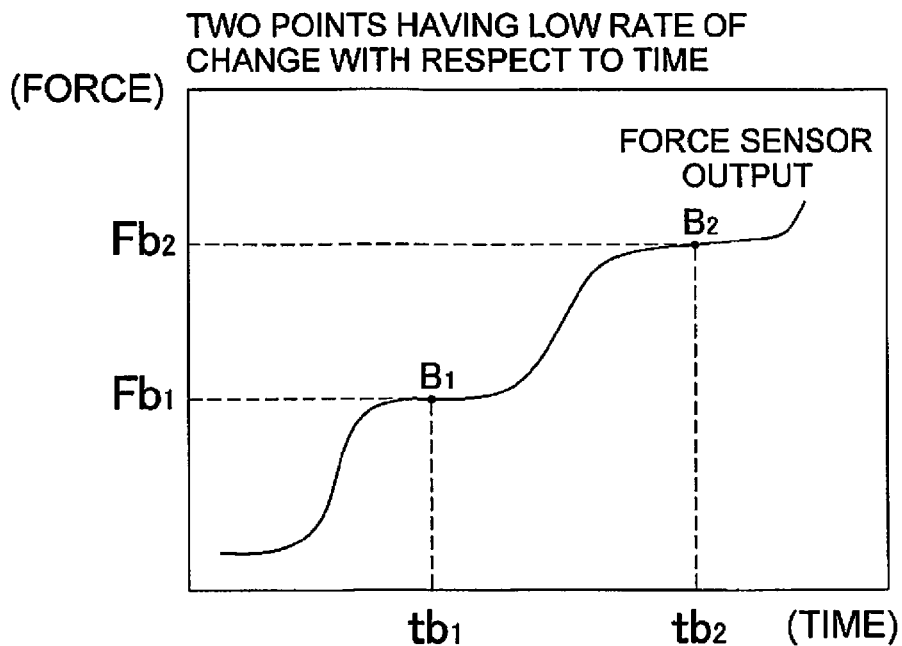
FIG. 24 is a graph showing a first output pattern of the force sensor.

FIG. 24 is a graph showing a first output pattern of the force sensor 1B. In FIG. 24, point $B_1$ and point $B_2$ are both points at which the rate of change in force with respect to time is low. Since there is a phase difference between the force sensor 1B and the acceleration sensor 4B, the phase difference must be compensated in order to calculate mass with good precision, but it is difficult to make perfect compensation because the phase difference is ordinarily inconstant.

However, when the two points have a low rate of change in force with respect to time, error can be minimized by an amount commensurate to the small amount of change over time in the measurement data, even there is a phase difference that cannot be fully compensated. Therefore, a phase difference is not liable to have an effect.

Points at which the derivative value of the output obtained by the force sensor 1B is near zero are preferentially selected as the two points having a low rate of change, and more preferred are points in the output obtained by the force sensor 1B at which the absolute value is high and the derivative value is low.

(2-2) Two Extremum Points

Figure 25:
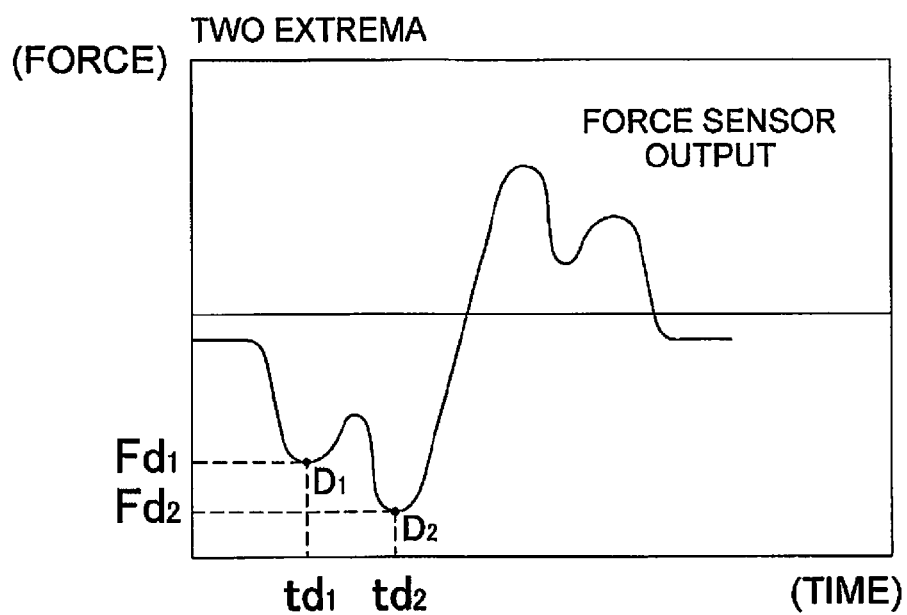
FIG. 25 is a graph showing a second output pattern of the force sensor.

FIG. 25 is a graph showing a second output pattern of the force sensor 1B. In FIG. 25, point $D_1$ and point $D_2$ are extremum points. The advantage of selecting extremum points is that an extremum point in the output of the acceleration sensor 4B that corresponds to an extremum point in the output of the force sensor 1B is readily identified. The reason is that a phase difference between the force sensor 1B and the acceleration sensor 4B is several microseconds to several milliseconds, and the probability that a plurality of extremum points will be present within that difference is extremely low. Consequently, an extremum point in the output of the acceleration sensor 4B that corresponds to an extremum point in the output of the force sensor 1B is readily identified. Therefore, a phase difference is not liable to have an effect.

(2-3) Minimum Point and Maximum Point

Figure 26:
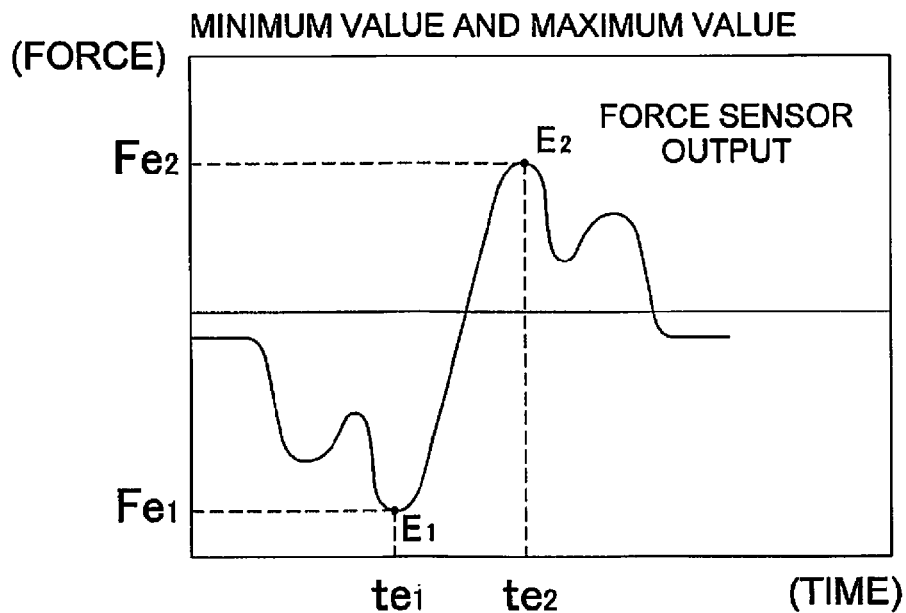
FIG. 26 is a graph showing a third output pattern of the force sensor.

FIG. 26 is a graph showing a third output pattern of the force sensor 1B. In FIG. 26, point $E_1$ and point $E_2$ are a minimal value point and a maximum value point. The advantage of selecting a minimal value point and a maximum value point is that the S/N ratio is higher and the precision for calculating mass is improved.

The ratio of the amount of noise (magnitude of error) with respect to the magnitude of the signal is reduced as the magnitude of the signal S is increased when the amount of noise N is constant. In this case, the magnitude of the signal S=[maximum value−minimum value]>[the difference in any other two points], and the ratio of the magnitude of error is less than taking any two other points, i.e., the S/N ratio is increased. Therefore, the precision for calculating mass is improved.

Figure 27:
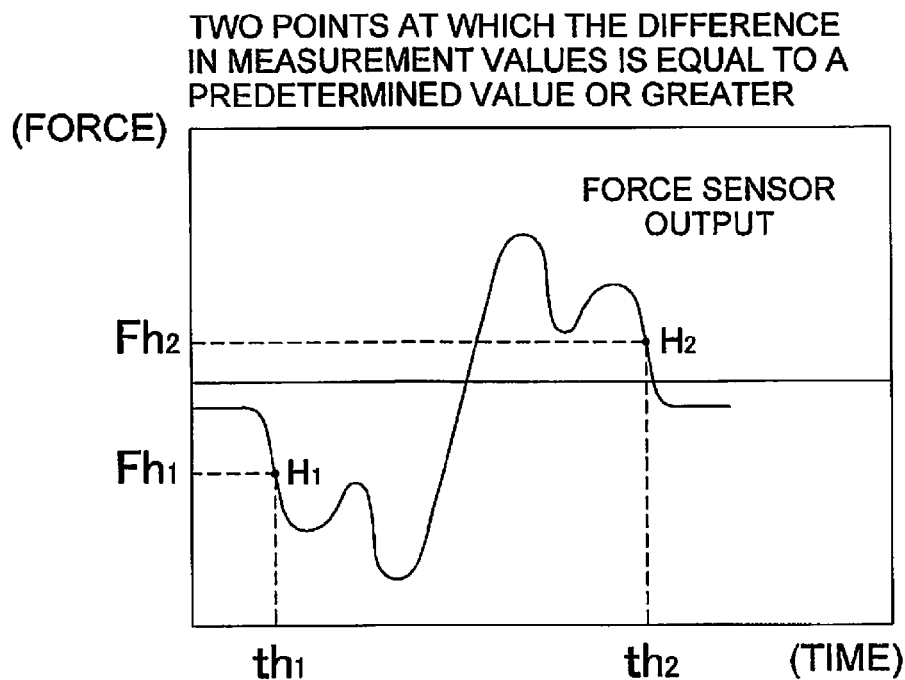
FIG. 27 is a graph showing a fourth output pattern of the force sensor.

(2-4) Two Points at which the Difference in Measurement Values is Equal to a Predetermined Value or Greater FIG. 27 is a graph showing a fourth output pattern of the force sensor 1B. In FIG. 27, point $H_1$ and point $H_2$ are two points at which the difference in measurement values is equal to a predetermined value or greater. The advantage of selecting two points at which difference in measurement values is equal to a predetermined value or greater is that the S/N ratio is greater and the precision for calculating mass is improved.

As noted in a preceding paragraph, the ratio of the amount of noise (magnitude of error) with respect to the magnitude of the signal is reduced as the magnitude of the signal S is increased when the amount of noise N is constant, and the S/N ratio is therefore increased. Since point $H_1$ and point $H_2$ are two points at which the difference in measurement values is equal to a predetermined value or greater, the magnitude of the signal S is at a predetermined value or greater. The predetermined value can be set sufficiently high with respect to the magnitude of the noise (magnitude of error) N, whereby the S/N ratio is increased. Therefore, the precision for calculating mass is improved.

(3) Characteristics (3-1)

In the mass measurement device 100B, the control unit 40 calculates the mass of the article Q using the difference in the force measurement values at two points obtained by the force sensor 1B and the difference in the acceleration measurement values at two points obtained by the acceleration sensor 4B in coordination with the force sensor 1B. Therefore, a reference point outputs for the force sensor 1B and the acceleration sensor 4B are not required. As a result, the effect of variability in the reference point output at the time mass is measured, i.e., the effect of gravity, is excluded, and the precision for calculating mass is therefore improved.

(3-2)

In the mass measurement device 100B, the two points obtained by the force sensor 1B are two points having a low rate of change with respect to time, and when a difference in phase of the outputs of the force sensor 1B and the acceleration sensor 4B occurs, the effect of the difference in phase can thereby be kept low.

(3-3)

In the mass measurement device 100B, the two points obtained by the force sensor 1B are both extremum points, whereby the extremum point in the output of the acceleration sensor 4B that corresponds to the extremum point in the output of the force sensor 1B is easily identified and is therefore not liable to be affected by a phase difference.

(3-4)

In the mass measurement device 100B, the two points obtained by the force sensor 1B are the maximum value point and the minimum value point, whereby the magnitude of the signal S=[maximum value−minimum value]>[the difference in any other two points] and when the ratio of the amount of noise (magnitude of error) is constant, the ratio of the magnitude of error is less than taking any two other points, the S/N ratio is increased, and the precision for calculating mass is therefore improved.

(3-5)

In the mass measurement device 100B, the two points obtained by the force sensor 1B are two points at which the difference in the force measurement values is a predetermined or greater, whereby the magnitude of the signal S becomes a predetermined value or greater. The predetermined value can be set sufficiently high with respect to the magnitude of the noise (magnitude of error) N, whereby the S/N ratio is increased, and the precision of the calculation of mass is improved by a commensurate amount.

(4) Modification Examples

In the embodiments above, the control unit 40 calculates the mass of the article Q using the difference in the force measurement values at two points obtained by the force sensor 1B and the difference in the acceleration measurement values at two points obtained by the acceleration sensor 4B in coordination with the force sensor 1B, but no limitation is imposed thereby.

In the mass measurement device 100B according to this modification example, the control unit 40 calculates the mass of the article Q using the difference in the acceleration measurement values at two points obtained by the acceleration sensor 4B and the difference in the force measurement values at two points obtained by the force sensor 1B in coordination with the acceleration sensor 4B.

Therefore, in the same manner as the embodiments described above, using the difference between two points in the output obtained from the acceleration sensor 4B and the difference between two points in the output obtained from the force sensor 1B makes it possible to calculate the mass without determining a reference point output, even when the component force of gravity (mg·sin θ) is included in the output value of the force sensor 1B.

Also, in the same manner as the embodiments described above, when the values of the output are at two proximal points, the ratio of the magnitude of error with respect to the magnitude of signal increases, and there is a possibility that the precision for calculating mass will be reduced. In this modification example as well, it is preferred that possible output patterns of the acceleration sensor 4B be envisioned and that two optimal points be selected for each output pattern. The two optimal points for each output pattern are described below.

(4-1) Two Points Having a Low Rate of Change with Respect to Time

In the mass measurement device 100B according to the modification example, the two points obtained by the acceleration sensor 4B are two points having a low rate of change with respect to time. With two points having a low rate of change in acceleration with respect to time, error can be minimized by an amount commensurate to the small amount of change over time in the measurement data, even there is a phase difference that cannot be fully compensated. Therefore, a phase difference is not liable to have an effect.

Points at which the derivative value of the output obtained by the acceleration sensor 4B is near zero are preferentially selected as the two points having a low rate of change, and more preferred are points in the output obtained by the acceleration sensor 4B at which the absolute value is high and the derivative value is low.

(4-2) Two Extremum Points

In the mass measurement device 100B according to the modification example, the two points obtained by the acceleration sensor 4B are extremum points. The phase difference between the acceleration sensor 4B and the force sensor 1B is several microseconds to several milliseconds, and the probability that a plurality of extremum points will be present within that difference is therefore extremely low. Consequently, an extremum point in the output of the force sensor 1B that corresponds to an extremum point in the output of the acceleration sensor 4B is readily identified. Therefore, a phase difference is not liable to have an effect.

(4-3) Minimum Point and Maximum Point

In the mass measurement device 100B according to the modification example, the two points obtained by the acceleration sensor 4B are a minimal value point and a maximum value point. The ratio of the amount of noise (magnitude of error) with respect to the magnitude of the signal is reduced as the magnitude of the signal S is increased when the amount of noise N is constant. In this case, the magnitude of the signal S=[maximum value−minimum value]>[the difference in any other two points], and the ratio of the magnitude of error is less than taking any two other points, i.e., the S/N ratio is increased. Therefore, the precision for calculating mass is improved.

(4-4) Two Points at which the Difference in Measurement Values is Equal to a Predetermined Value or Greater In the mass measurement device 100B according to the modification example, the two points obtained by the acceleration sensor 4B are two points at which the difference in measurement values is equal to a predetermined value or greater. As noted in a preceding paragraph, the ratio of the amount of noise (magnitude of error) with respect to the magnitude of the signal is reduced as the magnitude of the signal S is increased when the amount of noise N is constant, and the S/N ratio is therefore increased. With two points at which the difference in measurement values is equal to a predetermined value or greater, the magnitude of the signal S is at a predetermined value or greater. The predetermined value can be set sufficiently high with respect to the magnitude of the noise (magnitude of error) N, whereby the S/N ratio is increased. Therefore, the precision for calculating mass is improved.

Sixth Embodiment

An object of the mass measurement device according to a sixth embodiment is to switch the measurement scheme in accordance with the movement state (including stationary) of an article when mass is measured. The sixth embodiment is described below.

In the description of the sixth embodiment, the same terms and reference numerals in the fourth embodiment will be used for the portions of the configuration that are the same as the fourth embodiment.

(1) Second Mass Measurement Scheme

The use of the mass measurement scheme (hereinafter referred to as the first mass measurement scheme) in the mass measurement device according to the first to fifth embodiments held that, as a precondition, the article is moving, but in the production of some specific products, there are cases in which it is desirable to measure mass by merely lifting the article Q. In such cases, it is unreasonable to impart acceleration to the article Q in the first mass measurement scheme to measure mass. In view of this fact, in the mass measurement device 100B, when mass is measured while the article Q article is being moved at low speed and at constant speed, or when mass is measured in a substantially stationary state in which the article is merely lifted, measurement is carried out using the second mass measurement scheme, which is a measurement scheme that is different from the first mass measurement scheme.

The second mass measurement scheme basically divides the vertical force acting on the article Q by gravitational acceleration, or applies the principle thereof to calculate the mass of an article Q. Therefore, the output of the force sensor 1B is theoretically the vertical force acting on the article Q, but vibrations in the production area are propagated to the article Q via the robot arm 3B and the chucking unit 2B. Consequently, a vibration component is included in the output of the force sensor 1B.

Therefore, in the second mass measurement scheme, the output of the acceleration sensor 4B is deemed to be vibration acceleration that acts on the article Q, and the value obtained by multiplying that output by a coefficient based on the mass of a structure accessory to the acceleration sensor 4B is subtracted from the output of the force sensor 1B. As a result, the mass of the article is measured with the effect of vibration having been removed. Portions that support the measurement of mass using the second mass measurement scheme shall be generically referred to as a second mass measurement unit.

(2) Control System of the Second Mass Measurement Scheme

Figure 28:
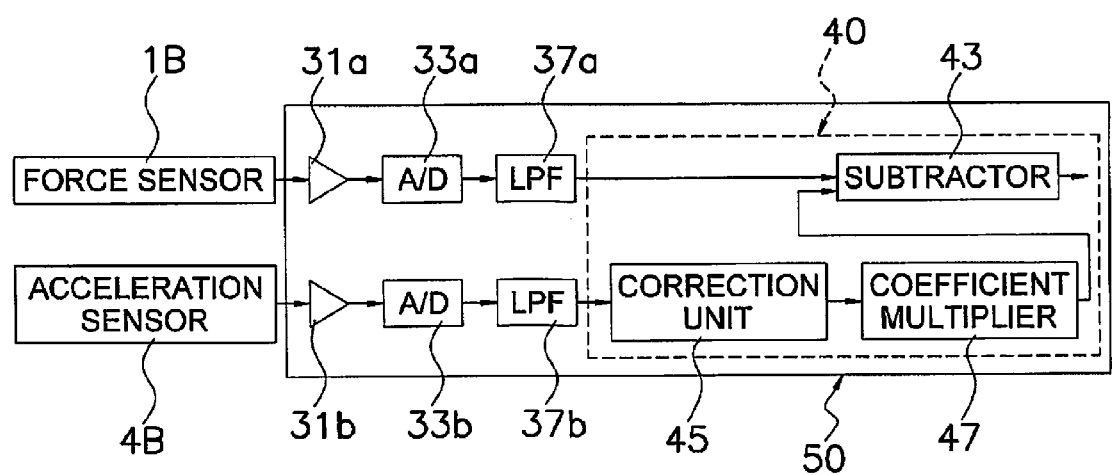
FIG. 28 is a block view of the control system in the second mass measurement scheme of the mass measurement device.

FIG. 28 is a block view of the control system in the second mass measurement scheme of the mass measurement device 100B. In FIG. 28, the control unit 40 corrects the detection signal of the acceleration sensor 4B that has passed through a low-pass filter 37b to a zero level with the aid of a correction unit 45 using the output level corresponding to the weight component of the structure accessory to the acceleration sensor 4B. Next, the control unit 40 multiplies the detection signal that has passed through the correction unit 45 by a coefficient that is based on the mass of the structure accessory to the acceleration sensor 4B with the aid of a coefficient multiplication unit 47.

The control unit 40 subtracts the detection signal of the acceleration sensor 4B that has passed through the coefficient multiplication unit 47 from the detection signal of the force sensor 1B that has passed through the low-pass filter 37a to calculate the mass m.

(3) Operation of the Mass Measurement Device 100B

An operational example of the mass measurement device 100B configured in the manner described above will be described below. For example, the mass of an article flowing on a conveyor in a certain production step is measured, the mass is then checked, and the article is boxed. When the mass is checked, it is assessed whether the mass of the article is within a predetermined allowance range. Products that pass the check are boxed, and products that fail the check are put into a defective product box. In the present production step, a plurality of types of articles are processed.

(3-1) Weighing Scheme in Each Operation

The control unit 40 holds the article Q flowing along a conveyor using the chucking unit 2B. Next, the control unit 40 controls the operation of the robot arm 3B and moves the article Q to cause acceleration to act on the article (an operation for lifting the article from the conveyor). At this time, setting the direction of sensitivity of the force sensor 1B and the acceleration sensor 4B to be vertical makes it possible to detect the force and acceleration acting on the article Q, the force and acceleration being brought about by movement in the vertical direction. The directions of sensitivity are directions in which sensor output is maximal when an arbitrary force is made to act in various directions on the sensors which react to a force such as a load cell.

The control unit 40 divides the output of the force sensor 1B by the output of the acceleration sensor 4B with the aid of the divider 41. The control unit 40 thereafter functions as a subtractor 43 to thereby compute the formula (12) using the division results determined in the preceding stage, and compute the mass m (first mass measurement scheme).

The control unit 40 subsequently moves the article Q horizontally (an operation for moving the article from above the conveyor to above a cardboard box). At this time, the direction of sensitivity of the force sensor 1B and the acceleration sensor 4B is perpendicular with respect to the movement direction, and the force sensor 1B and the acceleration sensor 4B therefore hardly detect the force and acceleration in the movement direction. Therefore, the output of the force sensor 1B can be regarded to be force in the vertical direction that acts on the article Q, and the mass m of the article Q can be calculated in the second mass measurement scheme. Also, the output of the acceleration sensor 4B is deemed to be mechanical vibration propagated to the article Q, and the output of the acceleration sensor 4B is subtracted from the output of the force sensor 1B to thereby remove the effect of mechanical vibration from the output of the force sensor 1B and thereby improve weighing precision (second mass measurement scheme).

(3-2) Selecting a Mass Measurement Scheme

In the first mass measurement scheme, since the output signal increases in commensurate fashion with the increase in acceleration during movement, the S/N ratio improves and mass calculation results are obtained with high precision. Meanwhile, in the second mass measurement scheme, since mechanical vibrations and other external disturbances added to the output of the force sensor 1B are reduced in commensurate fashion with a reduction in acceleration during movement, weighing precision is improved. For example, when mass is measured while an article Q is being moved at low speed and at constant speed, or when mass is measured in a substantially stationary state in which the article Q is merely lifted, it is more reasonable to use the second mass measurement unit than to accelerate the article merely to measure the mass using the first mass measurement unit.

In view of the above, the control unit 40 compares the maximum output of the acceleration sensor 4B in the first mass measurement scheme and a threshold value set in advance (e.g., 1.4 G). As a result, when the maximum output of the acceleration sensor 4B is at a threshold value or greater, the calculation results obtained by the first mass measurement scheme are used, and when less than the threshold value, the calculation results obtained by the second mass measurement scheme are used.

(3-3) Process for Checking Mass

When the calculated mass m of the article Q is within an allowance range, the control unit 40 assess that the article Q has passed the check. The control unit 40 thereafter controls the operation of the robot arm 3B and controls the article Q so as to be boxed in a cardboard box. Conversely, when the calculated mass m of the article Q is outside the allowance range, the control unit 40 assesses that the article Q has failed the check. The control unit 40 thereafter controls the operation of the robot arm 3B so that the article Q is carried to a defective article box.

Generally, in the production step in which a plurality of types of articles flow, the operation (acceleration) for moving the articles must be varied in accordance with the type of article (size, softness, ease of holding, and the like). For this reason, the operation for moving articles can be not fixed. However, as described above, mass measurement that corresponds to the operation for moving the article Q can be carried out with good precision because the mass of the article Q can be measured using two different mass measurement schemes without shifting the hold of the article Q.

(4) Characteristics (4-1)

The mass measurement device 100B is provided with a first mass measurement unit, a second mass measurement unit, and a control unit 40. The first mass measurement unit holds the article Q and measures the mass thereof. The second mass measurement unit measures the mass of the article Q using a different scheme from the first mass measurement unit while the article Q remains held in the first mass measurement unit. The control unit 40 preferentially measures mass using the second mass measurement unit when a predetermined condition holds true. In the mass measurement device 100B, mass measurement can be carried out using two mass measurement schemes without shifting the hold of the article Q. Therefore, measurement of mass with high precision that corresponds to the production situation can be achieved and wasted work time can be eliminated.

(4-2)

In the mass measurement device 100B, the second mass measurement unit measures mass in coordination with the measurement of mass by the first mass measurement unit. Therefore, the measurement value can be rapidly outputted after a predetermined condition holds true. As a result, mass is measured with high precision without a loss of production in the step.

(4-3)

The first mass measurement unit moves the article Q and divides the force acting on article Q during movement by the acceleration acting on the article Q during movement to calculate the mass of the article. The second mass measurement unit divides the force in the vertical direction acting on the article Q by gravitational acceleration, or applies the principle thereof to calculate the mass of the article. The second mass measurement unit is a mass measurement scheme generally used in a stationary state or a state of low vibration, and is used in combination with the first mass measurement unit for measuring mass that is being moved. The measurement scheme can thereby be changed in accordance with a change in the production steps, a change in product, and other changes in the production situation.

(4-4)

In this mass measurement device 100B, the first mass measurement unit has a chucking unit 2B for holding the article Q, a robot arm 3B for moving the chucking unit 2B, a force sensor 1B for measuring the force acting on an article being moved, and an acceleration sensor 4B for measuring the acceleration acting on an article being moved. The mass measurement device 100B is capable of measuring mass while the article Q is being moved, and when used in combination with an industrial robot, the inspection of mass and sorting of products based on the result of inspecting the mass can be carried out on the robot side. As a result, a weight checker and a sorting device can be removed from an existing production step.

(5) Modification Example (5-1) First Modification Example

In the embodiment described above, a single force sensor 1B detects force in the three directions of three dimensions, and a single acceleration sensor 4B detects acceleration in the three directions of three dimensions, but no limitation is imposed thereby.

Figure 29:
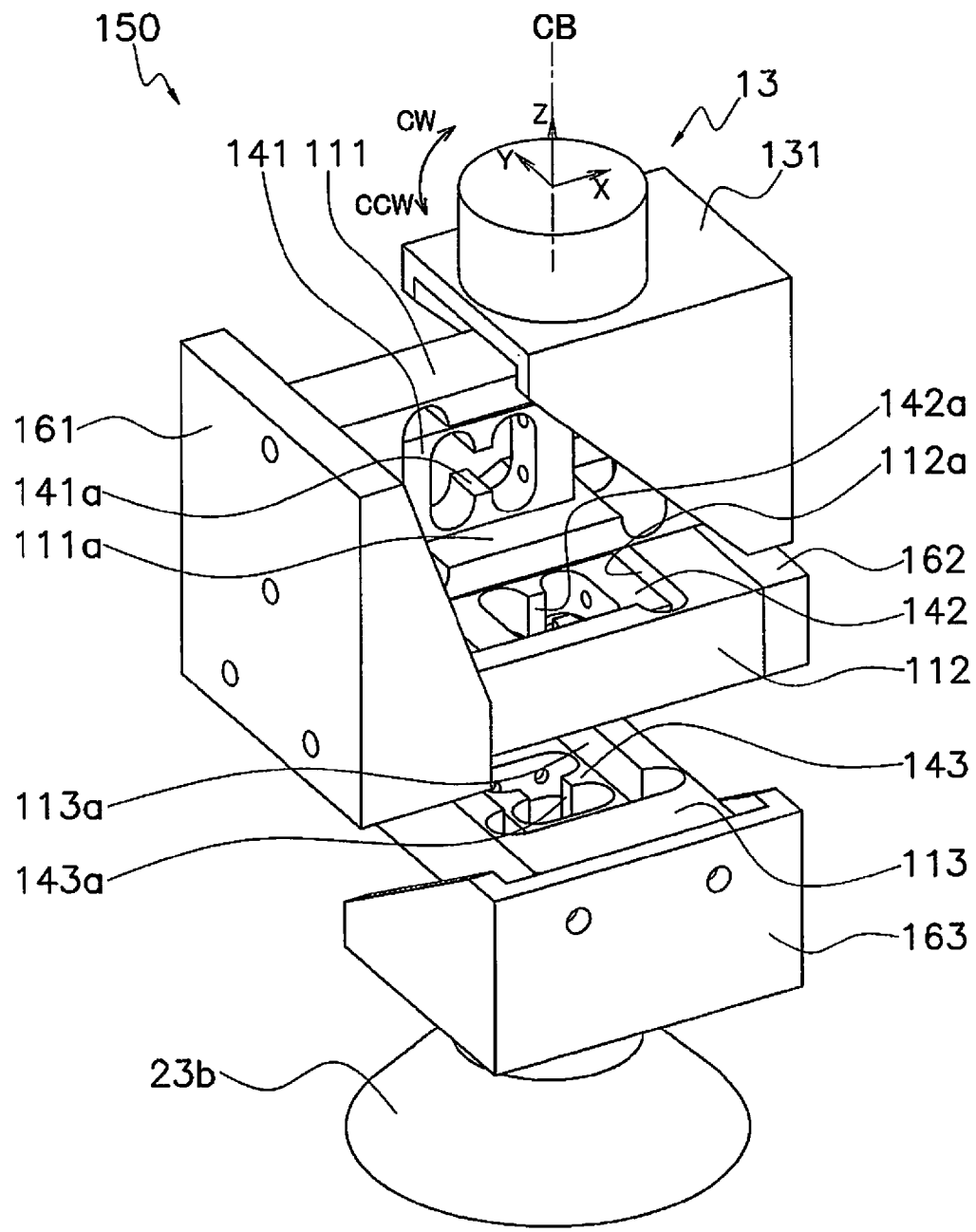
FIG. 29 is a schematic perspective view of the mass measurement device according to the first modification example.

FIG. 29 is a schematic perspective view of the mass measurement device 150 according to the first modification example. In FIG. 29, the mass measurement device 150 is provided with a robot hand 23b, a robot arm 13, a first force sensor 111, a second force sensor 112, a third force sensor 113, a first acceleration sensor 141, a second acceleration sensor 142, and a third acceleration sensor 143. An air chucking mechanism is used for the robot hand 23b in the same manner as the chucking unit 2B in the embodiments described above. The robot arm 13 moves the robot hand 23b in three dimensions. The robot arm 13 is also capable of rotating in the CW direction and the CCW direction about a predetermined rotational axis CB.

The first force sensor 111, the second force sensor 112, and the third force sensor 113 are strain gauge-type load cells. The strain gauge-type load cell has a free-end side that displaces by movement in a relative manner with respect to a fixed end side, and force that acts on the free-end side can thereby be detected.

The sensitivity directions of the first force sensor 111, the second force sensor 112, and the third force sensor 113 are arranged facing the Z-axis direction, the Y-axis direction, and the X-axis direction, respectively.

One end (the fixed end) of the first force sensor 111 is secured to the robot arm 13 via an attachment member 131, and a first connection member 161 is coupled to the free end of the first force sensor 111.

One end (the fixed end) of the second force sensor 112 is coupled to the first connection member 161, and a second connection member 162 is coupled to the free end of the second force sensor 112. One end (the fixed end) of the third force sensor 113 is coupled to the second connection member 162, and a third connection member 163 is coupled to the free end of the third force sensor 113. The robot hand 23b is coupled to the third force sensor 113 via the third connection member 163.

The first acceleration sensor 141, the second acceleration sensor 142, and the third acceleration sensor 143 are also strain gauge-type load cells, and the sensitivity directions thereof are arranged facing the Z-axis direction, the Y-axis direction, and the X-axis direction, respectively.

Holes that pass through in the direction orthogonal to the sensitivity directions and that are referred to as hollowed-out parts are provided in the first force sensor 111, the second force sensor 112, and the third force sensor 113, and shall be referred to hereinbelow as hollowed-out parts 111a, 112a, 113a.

Similarly, holes that pass through in the direction orthogonal to the sensitivity directions and that are referred to as hollowed-out parts are also provided in the first acceleration sensor 141, the second acceleration sensor 142, and the third acceleration sensor 143, and shall be referred to hereinbelow as hollowed-out parts 141a, 142a, 143a.

The sizes of the first acceleration sensor 141, the second acceleration sensor 142, and the third acceleration sensor 143 are about sizes that fit into the hollowed-out parts 111a, 112a, 113a of the first force sensor 111, the second force sensor 112, and the third force sensor 113.

The first acceleration sensor 141 is secured to a cantilever inside the hollowed-out part 111a of the first force sensor 111. The second acceleration sensor 142 is secured to a cantilever inside the hollowed-out part 112a of the second force sensor 112. The third acceleration sensor 143 is secured to a cantilever inside the hollowed-out part 113a of the third force sensor 113.

In a configuration such as that described above, the first force sensor 111 and the first acceleration sensor 141 detect force and acceleration that act on the article Q when the article Q is moved in Z-axis direction. The second force sensor 112 and the second acceleration sensor 142 detect force and acceleration that act on the article Q when the article Q is moved in the Y-axis direction. The third force sensor 113 and the third acceleration sensor 143 detect force and acceleration that act on the article Q when the article Q is moved in the X-axis direction.

In the mass measurement device 150 according to modification 1, mass can be measured while the article Q is being moved without restriction to the direction in which the article Q is being moved, and the mass measurement device is suitable for use in combination with an industrial robot.

(5-2) Second Modification Example

In the first modification example, force in the X-, Y-, and Z-axis directions that acts on the article Q is detected by three force sensors (load cells), and acceleration in the X-, Y-, and Z-axis directions that acts on the article Q is detected by three acceleration sensors (load cells), for a total of six required load cells. Costs could be reduced were it possible to detect force and acceleration using a single load cell for each.

Figure 30:
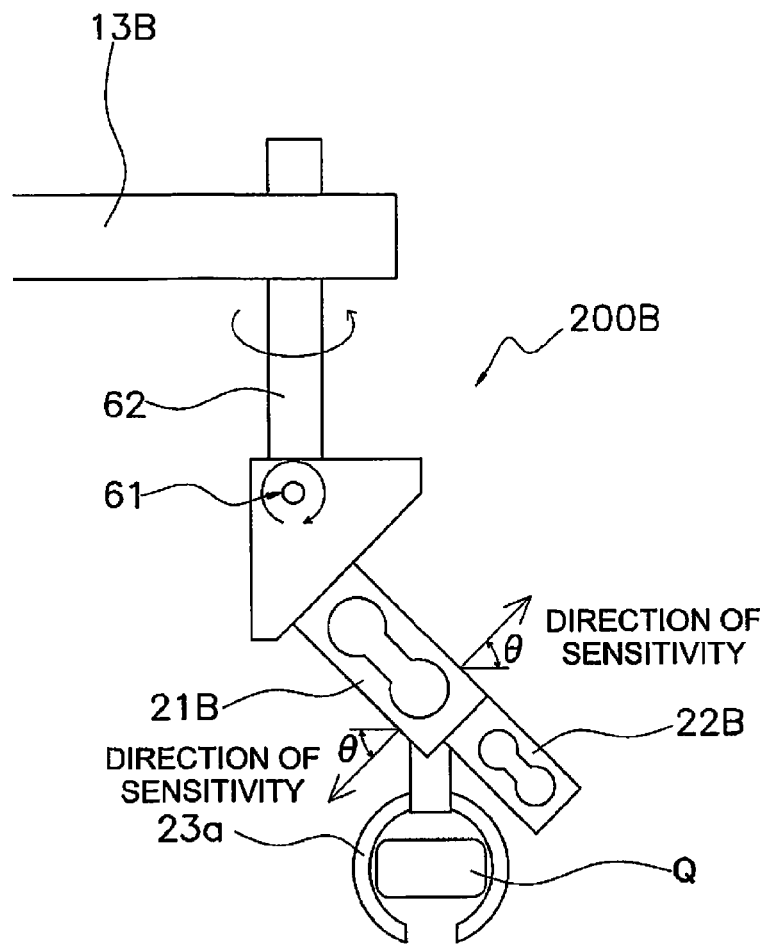
FIG. 30 is a side view of the mass measurement device according to the second modification example.

FIG. 30 is a side view of the mass measurement device 200B according to the second modification example. In FIG. 30, the mass measurement device 200B is provided with a force sensor 21B, a robot hand 23a, a robot arm 13B, and an acceleration sensor 22B. The force sensor 21B and the acceleration sensor 22B are strain gauge-type load cells, and are arranged in an orientation in which the sensitivity directions are tilted.

For example, when the sensitivity directions of the force sensor 21B and the acceleration sensor 22B are sloped at an angle $\theta$ with respect to the horizontal direction, the force sensor 21B detects the force $m \cdot (g+a) \sin \theta$ and the acceleration sensor 22B detects the acceleration $(g+a) \sin \theta$, where a is the acceleration in the vertical direction acting on the article Q having a mass m, and g is gravitational acceleration. On the other hand, the force sensor 21B detects the force $m \cdot a \cdot \cos \theta$ and the acceleration sensor 22B detects the acceleration $a \cdot \cos \theta$, where a is the acceleration in the horizontal direction acting on the article Q having a mass m.

As described above, the mass measurement device 200B according to the second modification example is capable of detecting the force and acceleration components in the sensitivity direction that act on the article Q, even when a single force sensor 21B and a single acceleration sensor 22B move in the vertical direction or the horizontal direction.

The force sensor 21B and the acceleration sensor 22B can be rotated about a horizontal axis 61, and the slope angle $\theta$ of the force sensor 21B and the acceleration sensor 22B can therefore be arbitrarily set. Furthermore, the force sensor 21B and the acceleration sensor 22B can also be rotated about a vertical axis 62 while sloped at any sloped angle $\theta$, and the sensitivity directions of the force sensor 21B and the acceleration sensor 22B can therefore be arbitrarily set. Therefore, the mass measurement device 200B according to the second modification is capable of causing the sensitivity directions of the force sensor 21B and the acceleration sensor 22B to follow changes in the movement direction of the article Q.

As a result, in the mass measurement device 200B according to the second modification example, force and acceleration can be measured in three mutually orthogonal directions including the vertical direction without providing additional force sensors 21B and acceleration sensors 22B.

(5-3) Third Modification Example

Figure 31A:
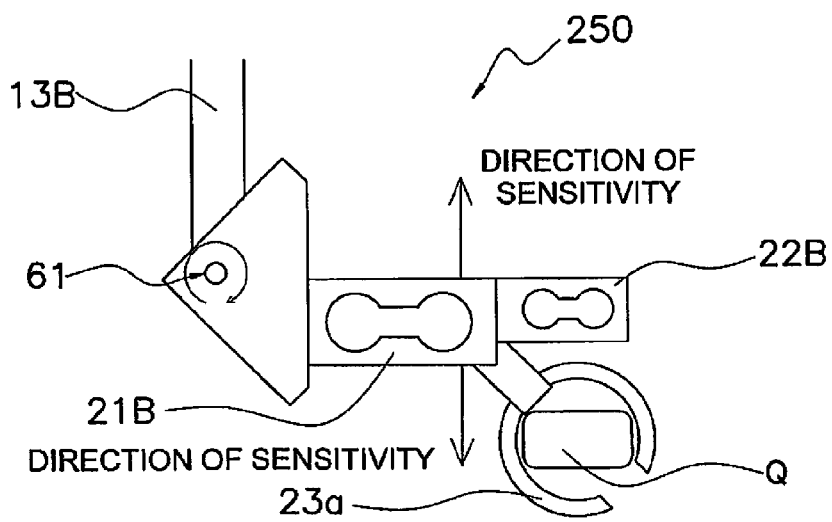
FIG. 31A is a schematic side view of the mass measurement device according to the third modification example in which the force sensor and the acceleration sensor are in a predetermined orientation.
Figure 31B:
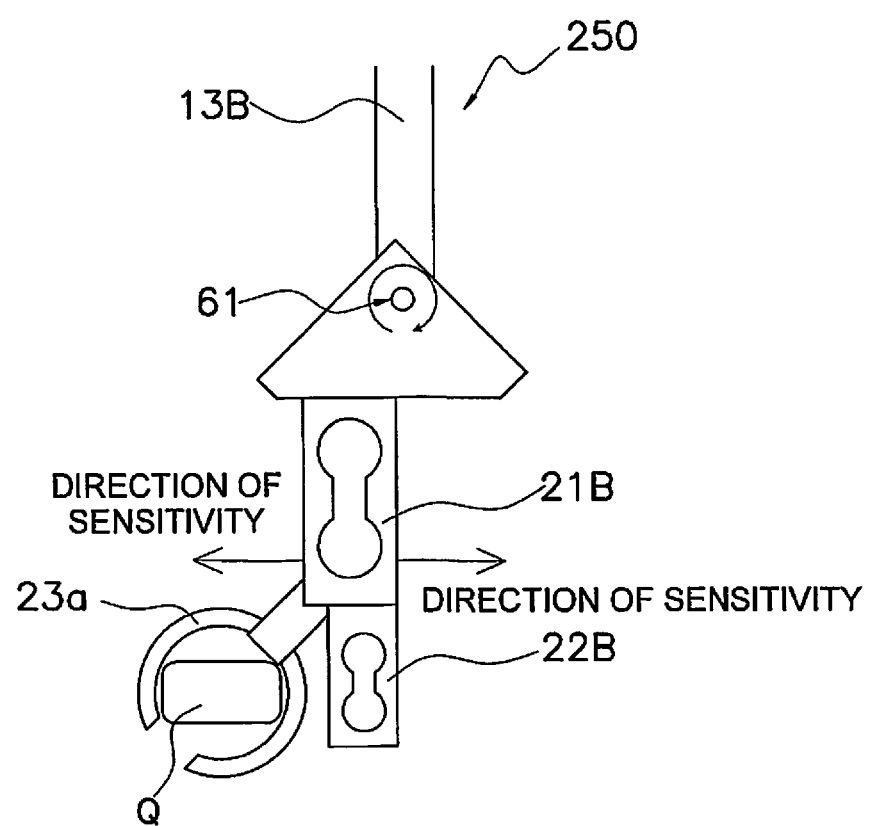
FIG. 31B is a schematic side view of the mass measurement device according to the third modification example in which the force sensor and the acceleration sensor are in another orientation.

FIG. 31A is a schematic side view of the mass measurement device 250 according to the third modification example in which the force sensor 21B and the acceleration sensor 22B are in a predetermined orientation. FIG. 31B is a schematic side view of the mass measurement device 250 according to the third modification example in which the force sensor 21B and the acceleration sensor 22B are in another orientation. The mass measurement device 250 in FIGS. 31A and 31B are in a configuration in which the rotation mechanism about the vertical axis 62 has been discarded from the second modification example shown in FIG. 30, but the configuration is otherwise the same as the second modification example.

In FIG. 31A, the sensitivity directions of the force sensor 21B and the acceleration sensor 22B of the mass measurement device 250 are oriented in the vertical direction. Vertical movement is ordinarily included in the movement of the article Q, and therefore the force sensor 21B and the acceleration sensor 22B will react. A component in the vertical direction is outputted to the force sensor 21B and the acceleration sensor 22B, even when the movement of the article Q is a three-dimensionally sloped direction.

The control unit 40 controls the robot hand 23a and the robot arm 13B to cause the article Q to move. Therefore, the mass can be calculated on the basis of the output of the force sensor 21B and the acceleration sensor 22B while the article Q is moving in a direction that includes the vertical direction.

On the other hand, in FIG. 31B, the sensitivity directions of the force sensor 21B and the acceleration sensor 22B of the mass measurement device 250 are oriented in the horizontal direction. Since the force sensor 21B and the acceleration sensor 22B can be rotated about the horizontal axis 61 to modify the orientation, the slope angle of the sensitivity directions of the force sensor 21B and the acceleration sensor 22B can be arbitrarily set.

Horizontal movement is ordinarily included in the movement of the article Q, and therefore the force sensor 21B and the acceleration sensor 22B will react. A component in the horizontal direction is outputted to the force sensor 21B and the acceleration sensor 22B, even when the movement of the article Q is a three-dimensionally sloped direction.

The control unit 40 controls the robot hand 23a and the robot arm 13B to cause the article Q to move. Therefore, the mass can be calculated on the basis of the output of the force sensor 21B and the acceleration sensor 22B while the article Q is moving in a direction that includes the horizontal direction.

Consequently, in the mass measurement device 250 according to the third modification example, the force and acceleration can be measured without providing additional force sensors 21B and acceleration sensors 22B, even in the vertical direction and the horizontal direction.

(6) Other

In the second mass measurement scheme, the acceleration sensors 4B, 141, 22B detect vibration acceleration that acts on the article Q, and it is apparent that, apart from the acceleration sensor 4B, 141, 22B, it is possible to provide a vibration sensor to the robot arm 3B, 13, 13B side to detect mechanical vibrations, and that such as configuration resides within the technical scope of the present invention.

INDUSTRIAL APPLICABILITY

As described above, in accordance with the present invention, the mass of an article can be measured while the article is being moved. The present invention is therefore also useful for inspecting for missing parts in internal components in an assembled product.

REFERENCE SIGNS LIST

1 Force sensor (force measurement unit)
2 Holding mechanism
2B Chucking unit
3 Movement mechanism
3B Robot hand
4 Acceleration sensor (acceleration measurement unit)
4B Acceleration sensor (acceleration measurement unit)
11 Robot arm (movement mechanism)
12 Distal-end base unit
13 Robot arm (movement mechanism)
13B Robot arm (movement mechanism)
21 Load cell (force measurement unit)
21B Force sensor (force measurement unit)
22 Acceleration sensor (acceleration measurement unit)
22B Acceleration sensor (acceleration measurement unit)
23 Robot hand (holding mechanism)
23a Robot hand (holding mechanism)
23b Robot hand (holding mechanism)
31a Amplifier
31b Amplifier
32a Low-pass filter
32b Low-pass filter
33a A/D converter
33b A/D converter
40 Control unit
41 Divider
42 Subtractor
51 Shaker (movement mechanism)
52 Shaker base
111 Force sensor (force measurement unit)
112 Force sensor (force measurement unit)
113 Force sensor (force measurement unit)
122 External monitoring device
141 Acceleration sensor (acceleration measurement unit)
142 Acceleration sensor (acceleration measurement unit)
143 Acceleration sensor (acceleration measurement unit)
222 Camera
Q Article (object to be weighed)

CITATION LIST

Prior Art Documents

Patent Documents

[Patent Document 1] Japanese Laid-open Patent Application No. 8-110261

The invention claimed is:
1. A mass measurement device for measuring a mass of an article while the article is in motion, the mass measurement device comprising:
a movement mechanism;
a force sensor fixedly attached to a distal end of the movement mechanism for movement therewith;
a holding mechanism fixedly attached to the force sensor, and configured to grab and hold the article and move the article in response to movement operations of the movement mechanism, the force sensor being configured to measure a force acting on the article during movement and output corresponding force measurement data;
an acceleration sensor fixedly attached to the holding mechanism for movement therewith and configured to measure acceleration acting on the article during movement and configured to output acceleration data; and a control circuit configured to operatively control the holding mechanism and the movement mechanism, and calculate the mass of the article on the basis of the force measurement data and the acceleration data, the control circuit being configured to conduct a first mass measurement dividing the force measurement data acting on the article acquired during a single movement of the article by the acceleration data acting on the article acquired during the single movement in order to calculate the mass of the article;

the control circuit being configured to conduct a second mass measurement of the article during the single movement at a different time from the first mass measurement, the control circuit including determining a vertical force acting on the article from the force measurement data acquired at the different time and determining gravitational acceleration from the acceleration data at the different time, the second mass measurement including dividing the vertical force acting on the article by the gravitational acceleration while the article is held by the holding mechanism during the single movement in order to calculate the mass of the article; and the control circuit being configured to determine mass of the object using the second mass measurement when a predetermined condition holds true, the predetermined condition being that the output of the first acceleration measurement must be less than a predetermined value such that a maximum output of the first acceleration measurement is less than a predetermined threshold value.

2. The mass measurement device according to claim 1, wherein, directions of sensitivity of the force sensor and the acceleration sensor include force and acceleration detection in three mutually orthogonal directions including the vertical direction.

3. The mass measurement device according to claim 1, wherein, directions of sensitivity of the force sensor and the acceleration sensor are sloped in a predetermined angle downward with respect to the horizontal plane.

4. The mass measurement device according to claim 1, wherein, the movement mechanism is configured to rotate about two mutually orthogonal axes including the vertical axis, and directions of sensitivity of the force sensor and the acceleration sensor include two mutually orthogonal directions corresponding to the mutually orthogonal axes.

5. A mass measurement device for measuring a mass of an article while the article is in motion, the mass measurement device comprising:

a holding mechanism configured to hold the article;

a movement mechanism coupled to the holding mechanism and configured to move the holding mechanism;

a force sensor fixedly attached to the holding mechanism and fixedly attached to the movement mechanism for movement therewith and configured to measure a force acting on the article during movement and configured to output corresponding force measurement data;

an acceleration sensor fixedly attached to the force sensor for movement therewith and configured to measure acceleration acting on the article during movement and configured to output acceleration data; and a control circuit configured to operatively control the holding mechanism and the movement mechanism, the control circuit being connected to the force sensor and the acceleration sensor receiving the force measurement data and acceleration data therefrom, the control circuit being configured determine at least one data point of a plurality of data points in the force measurement data that is an extremum and determine at least one data point of a plurality of data points in the acceleration data that is an extremum, the control circuit being further configured to calculate mass acting on the article on the basis of the force measurement data and the acceleration data during a single movement of the article at a time corresponding to at least one of the extremum of the force measurement data and the extremum of the acceleration data, the control circuit is further configured to calculate the mass of the article when the extremum of the force measurement data is offset from the extremum of the acceleration data with respect to time, and both the extremum of the force measurement data and the extremum of the acceleration data are used by the control circuit in the calculation of the mass of the article.

6. A mass measurement device for measuring a mass of an article while the article is in motion, the mass measurement device comprising:

a holding mechanism configured to hold the article;

a movement mechanism coupled to the holding mechanism and configured to move the holding mechanism;

a force sensor fixedly attached to the holding mechanism and fixedly attached to the movement mechanism for movement therewith and configured to measure a force acting on the article during movement and configured to output corresponding force measurement data;

an acceleration sensor fixedly attached to the force sensor for movement therewith and configured to measure acceleration acting on the article during movement and configured to output acceleration data; and a control circuit configured to operatively control the holding mechanism and the movement mechanism, the control circuit being connected to the force sensor and the acceleration sensor receiving the force measurement data and acceleration data therefrom, the control circuit being configured determine at least one data point of a plurality of data points in the force measurement data that is an extremum and determine at least one data point of a plurality of data points in the acceleration data that is an extremum, the control circuit being further configured to calculate mass acting on the article on the basis of the force measurement data and the acceleration data during a single movement of the article at a time corresponding to at least one of the extremum of the force measurement data and the extremum of the acceleration data, the control circuit being further configured to calculate the mass of the article when the extremum of the force measurement data is offset from the extremum of the acceleration data with respect to time, a value of the acceleration data at a time corresponding to the extremum of the force measurement data is furthermore used for calculating the mass of the article when the extremum of the force measurement data is used for calculating the mass of the article, and a value of the force measurement data at the time corresponding to the extremum of the acceleration data is furthermore used for calculating the mass of the article when the extremum of the acceleration data is used for calculating the mass of the article.

* * * * *